United States Patent
Mijares, Jr. et al.

(10) Patent No.: US 6,330,311 B1
(45) Date of Patent: Dec. 11, 2001

(54) LOW COST CALL ROUTING SYSTEM FOR TELECOMMUNICATIONS UNIT

(75) Inventors: Anthony Mijares, Jr.; Juan Jose Pino, both of Miami Lakes; Silvio A. Cardoso, Weston, all of FL (US)

(73) Assignee: L.C.R. Global Communications, Inc., Miami Lakes, FL (US)

( * ) Notice: Subject to any disclaimer, the term of this patent is extended or adjusted under 35 U.S.C. 154(b) by 0 days.

(21) Appl. No.: 09/136,864

(22) Filed: Aug. 19, 1998

(51) Int. Cl.[7] .................................................. H04M 15/00
(52) U.S. Cl. ............................. 379/112.01; 379/114.02; 379/114.1; 379/221.01; 379/221.02
(58) Field of Search .................. 379/111–118, 120–121, 379/127, 133–134, 143–144, 219–222, 121.01, 121.02, 128, 242, 244, 243

(56) References Cited

U.S. PATENT DOCUMENTS

| | | | |
|---|---|---|---|
| 4,866,763 | * 9/1989 | Cooper et al. | 379/221 |
| 4,888,822 | 12/1989 | Weinberger et al. | 379/130 |
| 4,972,464 | 11/1990 | Webb et al. | 379/112 |
| 5,408,526 | * 4/1995 | McFarland et al. | 379/202 |
| 5,473,630 | 12/1995 | Penzias et al. | 375/114 |
| 5,553,124 | 9/1996 | Brinskele | 379/112 |
| 5,570,417 | 10/1996 | Byers | 379/115 |
| 5,668,955 | 9/1997 | deCluitiis et al. | 379/130 |
| 5,799,072 | * 8/1998 | Vulcan et al. | 379/114 |
| 5,991,306 | * 11/1999 | Burns et al. | 370/429 |

FOREIGN PATENT DOCUMENTS

| | | |
|---|---|---|
| 0532231 | 9/1992 | (EP) . |
| 0725512 | 1/1996 | (EP) . |
| 0853438 | 1/1998 | (EP) . |

OTHER PUBLICATIONS

Ascom AG Bern Product Specification for Autorouting, Remote LCR and Service Platform Products, Internet Site "ascom.ch/index–js", Dec. 16, 1997, 12 pgs.

* cited by examiner

Primary Examiner—Duc Nguyen
(74) Attorney, Agent, or Firm—Robert C. Kain, Jr.; Fleit, Kain

(57) ABSTRACT

The programmable device connects an initiating telecommunications device with a destination telecommunications device through one of a plurality of telecommunications carriers based upon information stored in a database in the programmable apparatus. The programmable apparatus includes input and output devices, a processor, a memory and various databases. The system accesses and obtains information from the database and establishes a telecommunications link between the initiating telecommunications device and the destination telecommunications devices via one of a preferred low cost call carrier or a least expensive low cost call carrier. The database includes access telephone numbers, clearance code data (i.e., PIN numbers), cost of call rate data for specific destinations, specific days of the week, date and time of day for a plurality of telecommunications carriers. A program in the memory operated by the processor in conjunction with the input and output devices, converts the dual tone multifrequency (DTMF) signals from the initiating telecommunications device into digital signals and extracts from the database either the preference low cost call carrier or the least expensive low cost call carrier based upon the current day, date, time of day and destination. The destination is extracted from the input telephone signals based upon country code (if present) and/or area code. Periodically and preferably during extreme off peak hours, the processor, based upon the output of an update timer, establishes a telecommunications link with a remotely disposed computer to update the database information. This update is particularly critical if the telecommunications carriers change the rate data for a specific destination or geographic region, or terminate specific low cost rates for certain days, dates, or time of day. In an enhanced system, a three-way conference call is made available.

30 Claims, 18 Drawing Sheets

LOW COST CALL ROUTING SYSTEM FOR TELECOMMUNICATIONS UNIT

The present invention relates to a programmable apparatus for routing telephone communications to low cost call telecommunications carriers or preferred telecommunications carriers.

BACKGROUND OF THE INVENTION

Telecommunications systems include a plurality of telecommunications or long distance carriers which provide telephone communications and telecommunications links to telephones, fax machines, computers containing modems and other telecommunications devices. The telecommunications carriers price and charge users based upon rates generally unique to specific destinations, territorial regions, states, cities, countries, day of the week, dates and the time of day the telecommunications call is initiated by the calling party. These telecommunications rates change quite often with little or no notice given specifically to the users. However, some companies monitor telecommunications rates and the specific rate parameters.

Several systems have been proposed to determine and utilize low cost call carriers for a particular telecommunications session. For example, see U.S. Pat. No. 5,570,417 to Byers; U.S. Pat. No. 4,972,464 to Webb et al.; U.S. Pat. No. 5,553,124 to Brinskele; U.S. Pat. No. 5,473,630 to Penzias et al.; U.S. Pat. No. 5,668,955 to deCiutiis et al.; and, U.S. Pat. No. 4,88,822 to Weinberger et al.

OBJECTS OF THE INVENTION

It is an object of the present invention to provide a programmable apparatus connected to an initiating telecommunications device, via a local telephone telecommunications line, and connected to a second telephone telecommunications line and ultimately to a telecommunications device at a destination wherein the programmable apparatus selects one of a preferred low cost call carrier or a least expensive low cost call carrier from a database.

It is another object of the present invention to provide a programmable device which initiates, on a periodic basis, a telecommunications link with a remotely disposed computer such that the remotely disposed computer updates the database in the programmable apparatus and wherein the database includes, for a plurality of telecommunications carriers, access telephone numbers, clearance code data, cost of call rate data for specific destinations, day, date and time of day.

It is another object of the present invention to provide a programmable apparatus which, in one embodiment, utilizes power supplied by the telephone telecommunications line for its operation.

It is an additional object of the present invention to provide a programmable apparatus which stores the time duration of each call as well as the selected telecommunications carrier.

It is an additional object of the present invention to provide a programmable apparatus which determines when a time to connect to one of the preferred low cost call carrier or least expensive low cost call carrier exceeds a predetermined period and, in such event, selects the next available least expensive cost of call rate and telecommunications carrier for the current day, date, time of day and destination.

It is a further object of the present invention to provide a programmable apparatus which includes a scroll display and user input device such that the user can (a) select a preferred telecommunications carrier for a certain time of day, day of the week and/or destination; (b) display the low cost call carrier database including preferred carrier or carriers; (c) display the stored cost of call data; (d) display low cost call carriers for immediate selection by the user for his or her next telecommunications session; and (e) reset the low cost call carrier database.

It is another object of the present invention to provide a programmable apparatus which utilizes, in an enhanced embodiment, a three way conference call feature to select one of the preferred low cost call carrier or least expensive low cost call carrier and link a first remote telecommunications device with the initiating telecommunications device and a destination telecommunications device via the selected telecommunications carrier, all upon commands initiated from the first remote telecommunications device.

SUMMARY OF THE INVENTION

The programmable device connects an initiating telecommunications device with a destination telecommunications device through one of a plurality of telecommunications carriers based upon information stored in a database in the programmable apparatus. The programmable apparatus includes input and output devices, a processor, a memory and various databases. The system accesses and obtains information from the database and establishes a telecommunications link between the initiating telecommunications device and the destination telecommunications devices via one of a preferred low cost call carrier or a least expensive low cost call carrier. The database includes access telephone numbers, clearance code data (i.e., PIN numbers), cost of call rate data for specific destinations, specific days of the week, date and time of day for a plurality of telecommunications carriers. A program in the memory operated by the processor in conjunction with the input and output devices, converts the dual tone multifrequency (DTMF) signals from the initiating telecommunications device into digital signals and extracts from the database either the preference low cost call carrier or the least expensive low cost call carrier based upon the current day, date, time of day and destination. The destination is extracted from the input telephone signals based upon country code (if present) and/or area code. Periodically and preferably during extreme off peak hours, the processor, based upon the output of an update timer, establishes a telecommunications link with a remotely disposed computer. Upon establishment of this telecommunications link, the remotely disposed computer updates the database information in the programmable apparatus. This update is particularly critical if the telecommunications carriers change the rate data for a specific destination or geographic region, or terminate specific low cost rates for certain days, dates, or time of day. Preferably, this update session occurs at least once every two week period. In an enhanced system, a three-way conference call is established using one of the preferred carrier or the least expensive carrier. The conference call links the remotely disposed first telecommunications device with the initiating device and the destination device.

BRIEF DESCRIPTION OF DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a programmable apparatus for routing telephone telecommunications through a preferred low cost call carrier or a low cost call carrier to a destination telecommunications device.

Figure 1:
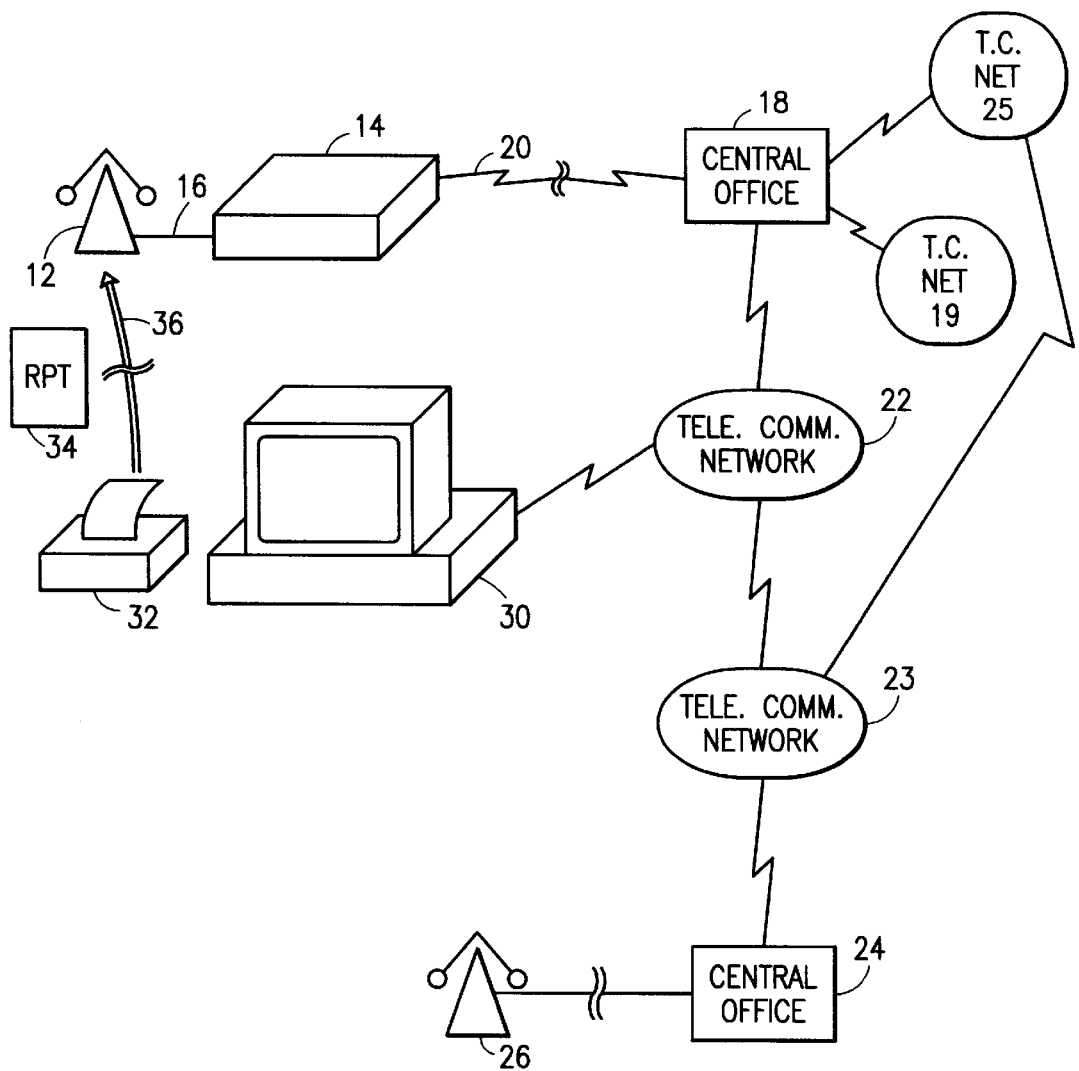
FIG. 1 diagrammatically illustrates the programmable apparatus and the telecommunications system including an initiating telecommunications device, a central office linked to a plurality of telecommunications carriers, a remotely disposed computer and a destination telecommunications device.

FIG. 1 diagrammatically illustrates a system diagram showing an initiating telecommunications device 12, a programmable apparatus or unit 14 coupled to telecommunications device (e.g., a telephone) 12 via a local telephone telecommunications line 16. Local line is generally short, e.g., 2–10 feet. Programmable apparatus or unit 14 is connected to a central office and is therefore linked to a plurality of telecommunications carriers 18 via a second telephone telecommunications line 20. Second line 20 may include a large number of telephonic lines and may extend miles. Central office 18 is generally characterized as the telephone switching office which enables initiating telecommunications device 12 to establish a telecommunications link with various long distance telecommunications carriers such as AT&T, MCI, Sprint, World Comm (formerly known as LDD S) and other primary and secondary telecommunications carriers (some of which may be categorized as "resellers" of telecommunications service lines). Based upon a signal packet originating at least initially from initiating telecommunications device 12, central office 18 establishes a telecommunications link with telecommunications network 22 and 23 and ultimately to another central office 24 relatively near destination telecommunications device 26. Of course, destination telecommunications device 26 may be directly connected to central office 18 without intervention of telecommunications network 22,23, however, one of these networks 22,23, T.C. net 19 and/or T.C. net 25 is the selected telecommunications carrier. Further, other networks could be utilized. These networks include land lines, mobile and cellular telecommunications channels, satellites and other long distance carrier systems.

The following abbreviations table may be helpfiil in understanding the drawings and this detailed description of the preferred embodiments.

| Abbreviations Table | |
|---|---|
| C.O. | central office |
| ntwk | network |
| A/D | analog to digital |
| DTMF | dual tone multifrequency |
| Reg. | register or memory unit |
| Func. | function |
| Sel. | select |
| DB | database or similarly configured spread sheet |
| Sys. | system |
| destin. | destination |
| LCC | lowest cost call carrier |
| PIN | unique user identification code |
| | (i.e., personal identification number) |
| SW | switch |
| Rcd | record |
| Ret | return |
| Disp | display |
| dy & T | current day and time |
| t-out | time out function |
| gen | generator |
| det | detect |
| I/O | input/output device |
| id | identification |

In a broad sense, programmable unit 14 contains a database listing a plurality of telecommunications carriers (AT&T, MCI, Sprint, World Comm and/or a wide variety of resellers of long distance services) and also lists each carrier's access telephone number, clearance code data (personal identification number or PIN number), cost of call rate data for specific destinations (country, regional territory, state, area code, local exchange), and the day of the week, expiration date and time of day those rates are active or available to the user. The following LCC database table lists some of the typical information stored in the memory of programmable unit 14.

---
Low Cost Call (LCC) Data Base (DB) Table

Day
Date limit or expiration dated (optional)
Time of day for applicable rate
Rate
Destination code associated with rate
Carrier id
Carrier access phone number
PIN unique to user or programmed device
Customer preference carrier code for day, time, regional territory

---

Based upon the destination telephone number (a dual tone multifrequency (DTMF) signal generated by initiating telecommunications device 12), programmable unit 14 locates, in a preferred embodiment, the least expensive low cost call carrier from the low cost call (LCC) database. In a further enhancement, the LCC database may also include a customer preference carrier for a particular day of the week, time of day and regional territory encompassing the destination telecommunications device 26. Programmable unit 14 extracts this information from the LCC database, reconfigures the telecommunications signal packet by adding the access telephone number for the selected carrier, the clearance code data for that carrier and the destination telephone number. This information or signal packet, after being reconverted into DTMF signals, is sent to central office 18. Central office 18 then establishes a telecommunications link with the particular telecommunications carrier associated with the access telephone number. The telecommunications carrier then, upon approval of the clearance code data, establishes a telecommunications link between the destination telecommunications device 26 and the initiating device 12. After completion of the call (the detection of an on-hook signal), the telecommunications carrier "rates" or assigns a cost to the call and sends a periodic or monthly bill to the person or company associated with the clearance code data. To avoid multiple bills from numerous companies, the clearance codes may be unique to the operators of remote computer 30 and these operators may send a single bill directly to the user (at initiating device 12). In this business system, the operators of computer 30 receive all bills from the LCC carriers.

Unfortunately, telecommunications carriers very frequently change the rates charged individuals and companies for telecommunication services. Oftentimes, the users of telecommunications services do not have accurate and current information regarding the cost of a telecommunications call because of the frequent changes in rates, time of day, special rates offered for certain days (for example, during weekends) and special rates charged for certain regional territories, states or countries. With the large increase in resellers of telecommunications lines, the user is presented with a greater number of telecommunications carriers, each of which have their own pricing structures and, to some degree, different "quality" telecommunications channels.

For example, it is fairly well known that the line quality offered by AT&T, MCI and Sprint is consistently better than a significant number of resellers of telecommunications services. However, these resellers offer less expensive rates for an identical call to an identical destination.

Accordingly, it is beneficial to provide a programmable unit 14 which automatically selects either a preferred low cost call (LCC) carrier or a least expensive low cost call (LCC) carrier from a stored database. As an example, a business person operating a home office may want to utilize a "high quality" telecommunications carrier during business hours in order to avoid busy signals and in order to guarantee a clear, telecommunications channel (with no cross-talk) for all "business" telecommunications sessions. However, during off peak or non-business hours (generally 6 PM through 8 AM and all day Saturday and all day Sunday), the home office business person may want programmable unit 14 to select the least expensive low cost call carrier in order to reduce his or her telephone bill. In this example, during business hours, programmable unit 14 would obtain the ID access telephone number and the clearance code data for the "preferred," high quality LCC carrier and, during non-business hours, programmable unit 14 would select the least expensive LCC carrier from its database. With international calls, the programmable selection of LCC carriers provides ever increasing cost savings to the user. Carriers operating over the Internet provide very low cost telecommunications services. However, line quality is poor. It is important that the user be able to program or preselect the preferred LCC carrier or reorganize the LCC carrier database as necessary and at will. These are some of the features of the present invention that are discussed in detail hereinafter. However, the invention encompasses these and many more features within the scope and spirit of the present invention and as established by the appended claims.

FIG. 1 also diagrammatically shows a remotely disposed computer 30 and an associated printer 32. In the illustrated system in FIG. 1, printer 32 generates a printed report 34 which is mailed via communications channel 36 (typically land based mail) to the user customarily located at initiating telecommunications device 12. In this instance, the user is also the owner or the leasee of the programmable unit 14.

Figure 2:
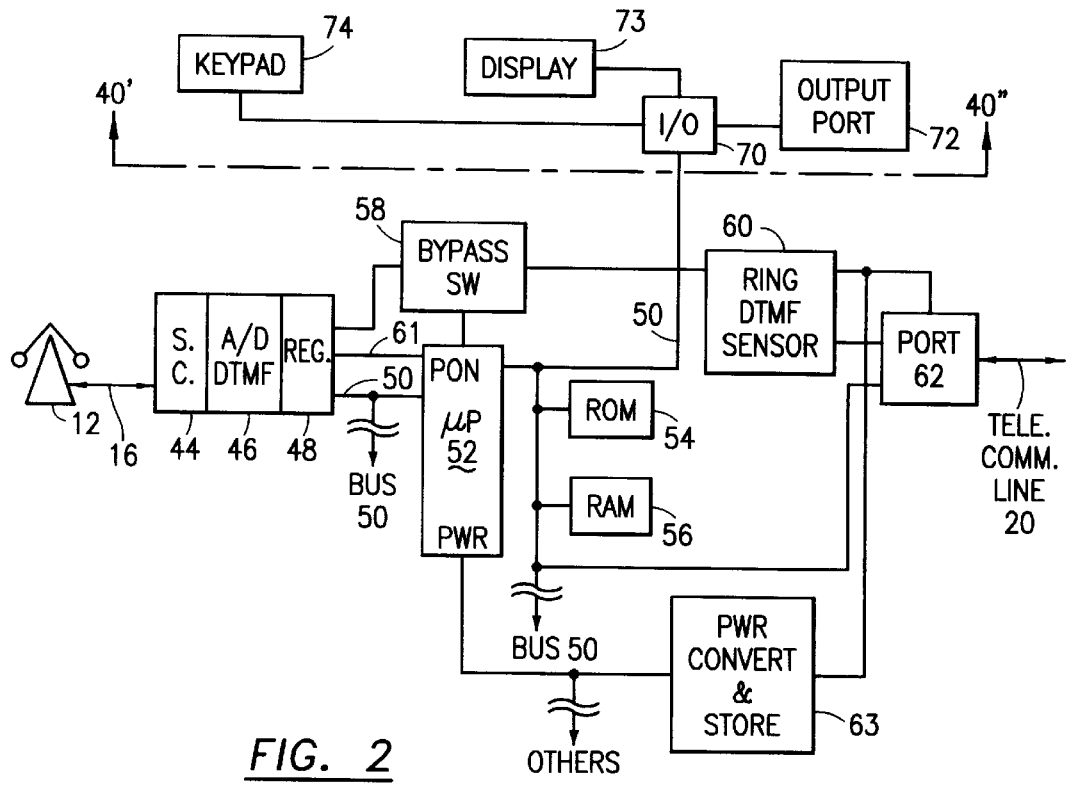
FIG. 2 diagrammatically illustrates a block diagram of the programmable apparatus (a portion of the diagram showing the apparatus powered by a telephone telecommunications line and another portion of the apparatus above the dash-dot-dash line 40'–40" requiring an independent power source)

FIG. 2 diagrammatically illustrates a block diagram of programmable unit 14 in a basic mode and the elements above the dash-dot-dash line 40'-40" represent elements of programmable unit 14 in an enhanced embodiment.

Figure 3:
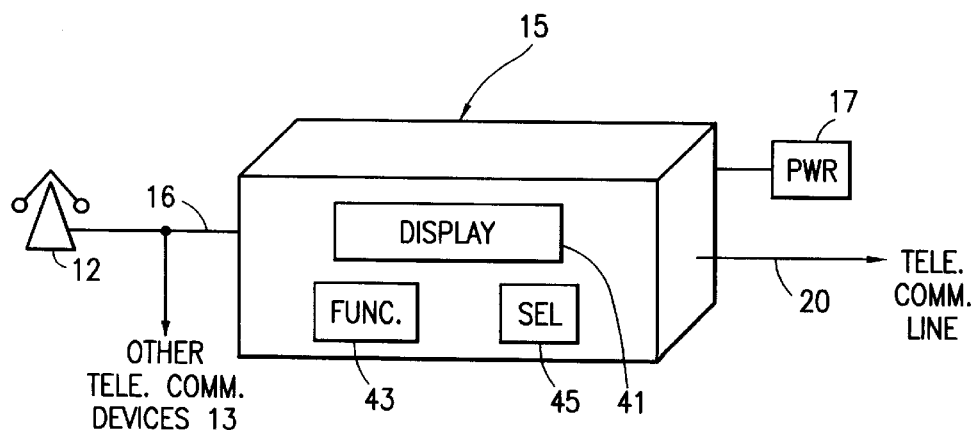
FIG. 3 diagrammatically illustrates an enhanced programmable device showing a display and user inputs (function and select inputs) and requiring an independent power source.

FIG. 3 diagrammatically illustrates programmable unit 15 in an enhanced embodiment. FIG. 1 shows a basic unit 14 without a display and without user input buttons, switches or panels. Initiating telecommunications device 12 is connected to programmable unit 15 via a local telecommunications line 16. Additionally, other telecommunications devices 13 can be connected to local telephone telecommunications line 16. Local line 16 is very short. Programmable unit 15 is supplied with power from source 17. Power source 17 may be AC power which is converted and transformed to low voltage DC power or may be a plurality of batteries. Programmable unit 15 is also connected to second telephone telecommunications line 20. Line 20 is very long and runs to the C.O. 18.

Programmable unit 15 includes a visual display 41 and two user actuator inputs 43, 45. In a preferred embodiment, function input 43 is a depressible button or panel and select input 45 is a similar button or depressible panel. Display 41 visually presents information to the user. Information is generally presented in a scrolling manner due to the small screen size of display 41.

Returning to FIG. 2, the items above dash-dot-dash line 40'–40" are found in the enhanced programmable unit 15. The items below the line are generally found in both the enhanced and the basic model.

The basic programmable unit includes a port 42 electrically connected to local telephone telecommunications line 16. Local telephone telecommunications 16 is generally a typical telephone line having four wires which connects into an appropriate jack in a telephone or other telecommunications device 12. Port 42 includes signal conditioner 44, and analog to digital A/D converter which converts DTMF tones into digital tones. A to D converter 46 may be referred to in the industry as a tone sensor and digital converter and a tone generator. Port 42 also includes register memory 48 which temporarily stores the digital representation of the DTMF signals. As is known in the industry, DTMF signals are specific tone frequencies that represent alpha numeric characters generated by the user based on tactile input on a telephone panel or telephone numbers generated by the initiating telecommunications device 12. The digital signals from port 42 are applied to bus 50 and are available to microprocessor 52 as well as to read only memory ROM 54 and random access memory RAM 56. Of course, the read only memory and/or the random access memory may be replaced by EPROMs or other digital memory units. Microprocessor 52 is electronically connected to a bypass switch 58 which permits two way telephonic communications after establishing a telecommunications link and a telecommunications session between the initiating telecommunications device 12 and the destination telecommunications device 26 (FIG. 1). When switch 58 is closed, the telephonic signals are not usually converted into digital signals.

Microprocessor 52 is also connected to a ring-DTMF sensor unit 60. Ring-DTMF sensor unit 60 is connected to port 62. Port 62 is connected to the second telephone telecommunications line 20. Port 62 is substantially similar to port 42.

The major difference between the basic programmable unit 14 and the enhanced programmable unit 15 is the presence of display 41 and user actuable inputs 43, 45 in the enhanced programmable unit 15. Further, the basic programmable unit draws power from the telephone telecommunications line and does not require an independent power source. See FIG. 3, source 17. The enhanced programmable unit 15 requires an independent power source, either a transformed AC to DC power or battery power.

The basic programmable unit is discussed immediately herein. The initiating telecommunications device 12 is activated by withdrawing a handheld unit or opening a switch and taking local telephone telecommunications line 16 off-hook. Thereafter, the user inputs a destination telephone number into initiating telecommunications device 12. This input may be done electronically for fax machines or computer modems. Port 42 not only conditions this input signal (the destination telephone number) but also converts the signal into a digital signal. This digital signal is temporarily stored in register memory 48. When register memory 48 is full or after a suitable time out period, register 48 initiates a signal on control line 61 which "wakes up" microprocessor 52. The "wake up" cycle may start upon a first detection of line activity on line 16. After a suitable time out period and when the register memory captures the entire destination number, microprocessor 52 activates power conversion unit 63 which is connected to the output of port 62 and directly connected to the second telephone telecommunications line. As discussed earlier, a line extends through bypass switch 58 and runs between port 62 and port 42.

After the destination phone number is temporarily stored in registered memory 48, and the power conversion in storage unit 63 draws enough power from the telephone telecommunications line, this power is applied to microprocessor 52 and the entire system is "powered up" and initialized. Of course, there are several power lines (not shown) from power conversion and storage unit 63 to other components to support the electronic operation of various components such as ROM 54, RAM 56 and Ring-DTMF sensor 60. After power is established to microprocessor 52 and the entire system "wakes up," the operation of the system follows in a manner substantially similar to the operation discussed later in conjunction with the flow charts.

After the telecommunications session ends and the telephone telecommunications line goes "on-hook", the basic system (below line 40'–40") powers down in order to conserve energy.

The enhanced programmable unit 15 (FIG. 3) includes input/output device 70 which is electrically connected to an output port or jack 17, display unit 73 and keypad or user input devices 74. The display unit draws too much power to utilize power from line 20. The enhanced unit does not include, as a necessary element, the power conversion and store unit 63. However, the enhanced unit may include the power conversion and storage unit 63 as a back up system in the event power is lost from power source 17. Essentially, microprocessor 52 receives tactile user inputs from keypad 74 (which may be a single depressible key or multiple depressible keys) and generates visual output data for display 73 which is shown on display screen 41. Output port 72 can be configured as a port to support various types of digital signal outputs such as an RS232 output port, or a port for a printer or a serial or parallel port for a computer. The microprocessor may be programmed to generate "call data reports" based upon a command sequence received from output port 72. In this sense, port 72 is an I/O.

Figure 4A:
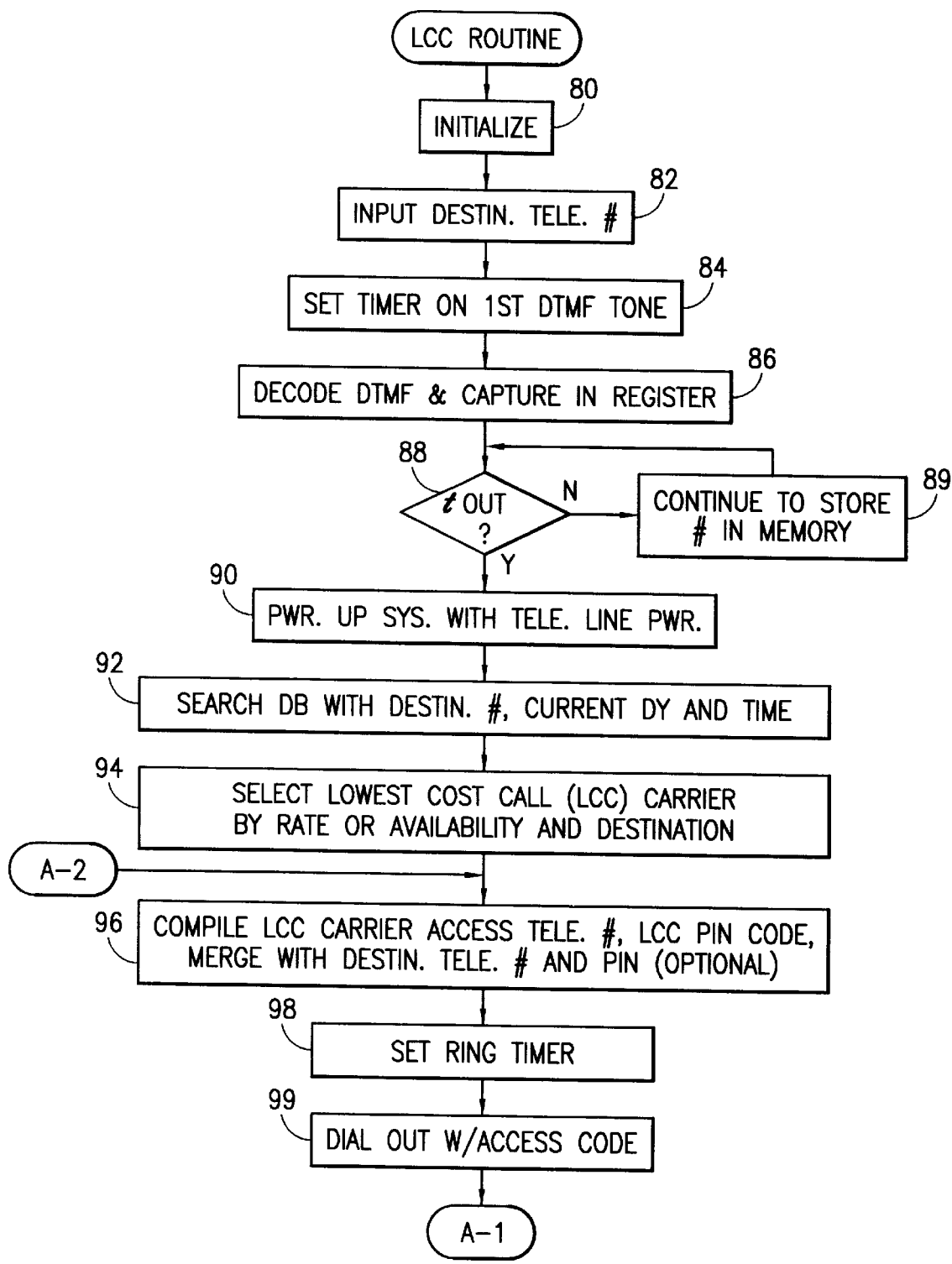
FIGS. 4a and 4b diagrammatically illustrate a flow chart showing the basic low cost call carrier routine.
Figure 4B:
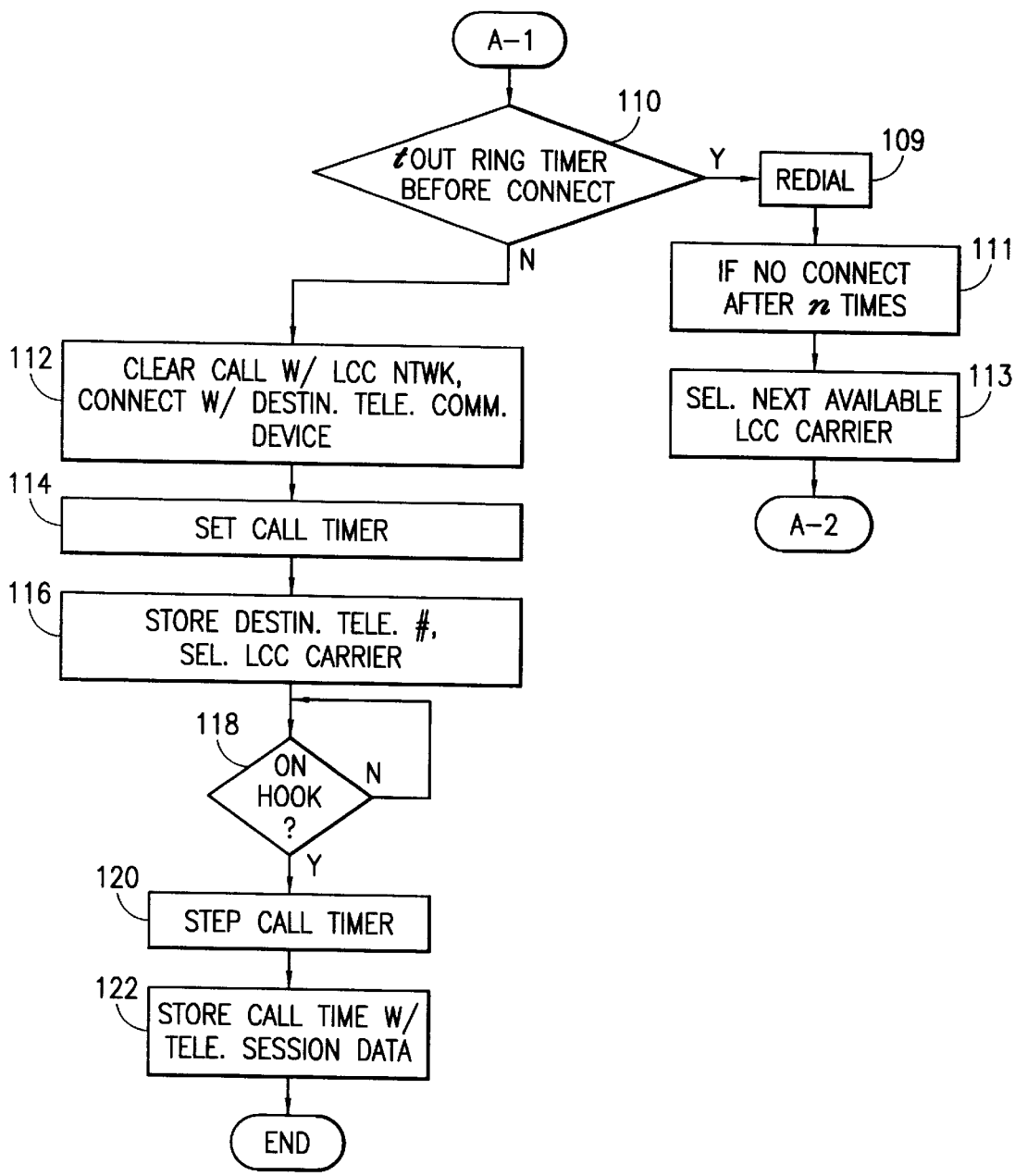

FIGS. 4a and 4b diagrammatically illustrate the basic elements of a flow chart for the low cost call carrier system. As used herein, the low cost call carrier may be a preferred carrier, initially selected by the user, or the least expensive low cost call carrier established based upon call rate data.

In step 80, the system is initialized. In step 82, the user, at initiating telecommunications device 12, inputs a destination telephone number.

In step 84, microprocessor 52, in combination with memory units 54, 56, sets a timer upon receipt of the first DTMF tone converted by port 42. In step 86, port 42 decodes the DTMF signals and captures the entire destination telephone number in register memory 48. Decision step 88 determines whether the timer has timed out. If not, in step 89, the system continues to store the destination telephone number in memory. If the timer has timed out, in step 90, the system powers up based upon power obtained from the telephone telecommunications line. It should be noted that the microprocessor and associated units may be programmed to be activated when the user strikes a unique key on initiating device 12 such as the # key or the * key. This may eliminate certain time out steps. As such, all the flow charts herein provide examples of the operation rather than precise operating parameters. The sequencing of the steps may change based upon the use of certain microprocessor and/or memory units.

The low cost call database is searched in step 92. This search is conducted initially based upon the destination telephone number by reviewing the country code, if present, and the area code for the input destination telephone number.

Also, the search is conducted based upon the current day of the week and the current time. The following destination locator table provides some examples of this type of search. Of course, the LCC database table may also include a destination locator database table in order to sort out and simplify the search for the preferred low cost call carrier or the least expensive low cost call carrier.

| Destination Locator Table |
|---|
| Initial code 011 or 01 plus n digits |
|     Country Database |
|         44 (U. K.) |
|         33 (France) |
|         81 (Japan) |
|         etc. |
| Initial code 1-800 or 1-888 plus 7 digits |
|     free call, activate bypass, no record (optional) |
| Initial code 1-900 plus 7 digits |
|     charge back call, activate bypass, record time (?) |
|     user may be required to input clearance code PIN prior to input |
| Initial code 1-local area code [e.g., 202] plus 7 digits |
|     go to local area code preference LCC DB |
| Initial code 1-non-local area code [e.g., not 202] plus 7 digits |
|     go to non local area code LCC DB |
| Initial code mmm plus 4 digits [no area code] |
|     go to direct telecommunications line |

The system, in a preferred mode, has a list of all area codes, toll free codes (800, 888) and charge back prefixes (900). Also, the system has a list of country codes. If the user inputs an erroneous area code or country code, that is, a code not listed in the database, the system activates the bypass function and connects the user with the central office. The central office 18 would then issue a voice error response informing the user regarding the erroneous area code or country code.

As described herein, the system may be programmed to block any area code, country code or charge back code (900). If the user wants to temporarily override the "block," he or she inputs a special clearance code (PIN) prior to inputting the destination telephone number. The PIN clears the block and permits the user to use the blocked area code or country code.

It should be noted that the enhanced programmable unit 15 may also include a power down and a wake up routine in order to conserve energy. It is relatively well known that microprocessors have these "sleep" modes.

In step 94, the system selects the lowest cost call LCC carrier by rate or availability and by destination. As identified above in connection with the database low cost call table, this table may include a customer preference carrier for day, time and regional territory. In step 94, if the customer or user has previously selected a preference carrier for the day, time or region encompassing the destination, that carrier would be selected rather than the least expensive low cost call carrier. In the absence of the customer preference or user preference, the least expensive low cost call carrier would be selected in step 94. The system defaults to the least expensive low cost call carrier in the absence of a customer or user preference.

In step 96, the system compiles the LCC carrier access telephone number, the LCC PIN code or clearance code data and merges that information with the destination telephone number. For example, in order to access the MCI telecommunications network, the user inputs the access phone number (1-800-888-8000), then inputs his or her clearance code PIN number (123-456-7891-2345) and then inputs the destination telephone number which is, in the United States, a three digit area code followed by a seven digit phone number. The programmable unit 14, 15 compiles these three numbers (access, clearance and destination) into a signal packet. In step 98, the system sets a ring timer in order to determine the time to connect to the LCC carrier. In step 99, the system dials up and transmits the signal packet which includes the LCC carrier access number, the LCC PIN or clearance code number and the destination telephone number to C.O. 18. This information is sent via port 62 (FIG. 2) to the second telecommunications line 20 and then to C.O. 18. The LCC access code number is recognized in central office 18 or telecommunications network 22 and the unique LCC telecommunications carrier network is then selected. After the LCC carrier approves the initiated telecommunications session by confirming the PIN code or the clearance code data, the LCC carrier then establishes the telecommunications link between initiating device 12 and the destination telecommunications unit 26. See FIG. 1. The system then jumps at jump point A-1 to FIG. 4b.

In decision step 110, a determination is made whether a time out has occurred on the ring timer (the "time to connect") prior to establishing the telecommunications session with the destination telecommunications device 26. In other words, the system determines whether an off-hook condition has been achieved with the destination telecommunication device 26. If a time out has occurred because an off-hook signal has not been detected by ring DTMF sensor 60 (FIG. 2), the YES branch is taken and the system redials the LCC carrier in step 109. In step 111 a determination is made whether a fully functional telecommunications session (an off-hook signal) is established after a predetermined number n times. If no connection is made after a certain number of times (for example, three times), the system in step 113 selects the next available, least expensive LCC carrier based upon cost of call rate, current day, current date, time of day and destination. Thereafter, the system follows jump point A-2 to a point immediately proceeding step 96 which compiles the LCC carrier access telephone number into a signal packet with the clearance code data and the destination telephone number.

If an off-hook signal has been sensed in step 110 within the time out frame of the time to connect period, the NO branch is taken and the system executes step 112. This step recognizes that a telecommunications session has been fully initiated with the LCC telecommunications network and connects the destination telecommunications device 26 with the initiating telecommunications device 12. This is accomplished by microprocessor 52 (FIG. 2) activating bypass switch 58 and thereby providing a non-digital telecommunications channel between ports 42, 62 and telecommunications telephone lines 16, 20. This essentially removes the microprocessor and associated digital units from the telecommunications path. With very sophisticated digital equipment, bypass switch 58 may be eliminated.

In step 114, microprocessor 52, in conjunction with programs in memory 54, 56 sets a call timer. This call timer maintains information regarding the length of the telecommunications call. In step 116, microprocessor 52 stores the destination telephone number and the selected LCC carrier in one of memory 54, 56. This storage of telecommunica tions session call data information may include various data set forth in the session data table identified below.

Session Data Table

Date, Day, Time of call
call timer data
rate (optional)
selected carrier
destination telephone number
country-region data (optional)
caller id (optional)
conference call (Y/N)

In decision step 118, the system determines whether the telecommunications session has ended by sensing an on-hook condition with ring DTMF sensor 60. If not, the system remains in a "call active" mode and continues to time the telecommunications session. If an on-hook condition has been sensed, the YES branch is taken and in step 120 the system stops the call timer. In step 122, the system stores the call time in the session data table (discussed above). Thereafter, the program ends or returns to the "await input of destination telephone number" step 82. If the basic programmable unit 14 is utilized, after a predetermined time period subsequent to storing the data in the session data table, the system powers down and microprocessor "goes to sleep." In an enhanced system, the same "power down" routine may be utilized in order to conserve energy.

Figure 5:
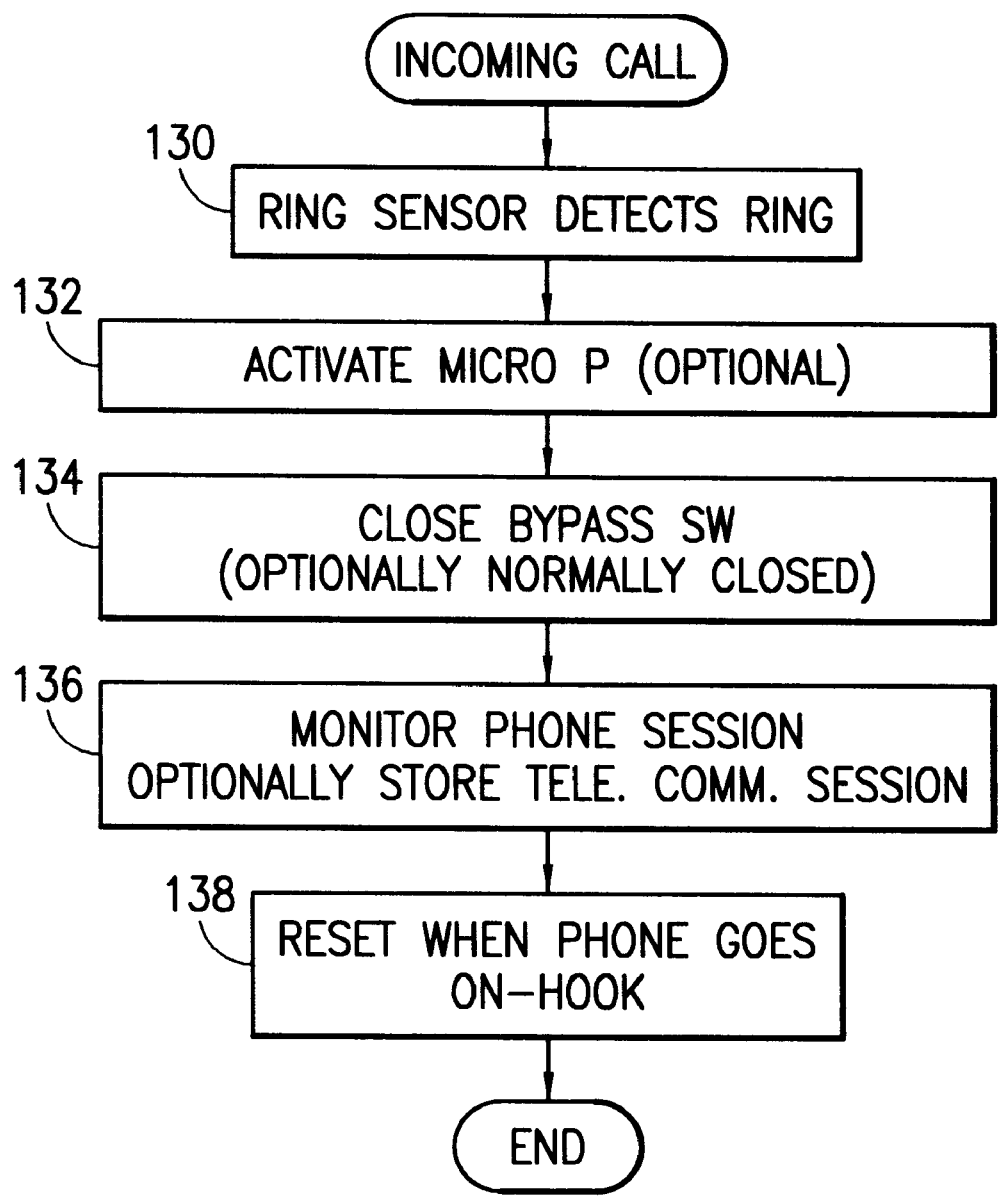
FIG. 5 diagrammatically illustrates a flow chart showing the incoming call routine.

FIG. 5 diagrammatically illustrates a basic flow chart to handle an incoming call from second telecommunications line 20. In step 130, ring sensor 60 determines the presence of a ring signal at port 62. In step 132, the system activates or awakes microprocessor 52. In step 134, the system closes bypass switch 58 thereby establishing a clear telecommunications channel between second telecommunications line 20 and local telecommunications telephone line 16. Optionally, step 132 may be omitted and the bypass switch 58 (FIG. 2) may be normally closed. In step 136, the system monitors the telecommunications or phone session and, as an option, stores information regarding that incoming telecommunications session. That information may be stored in the session data table and may include day, date, time of call, information regarding caller id, as well as other information. In step 138, the system resets itself when the telephone line goes on-hook signaling the end of the telecommunications session.

Figure 6:
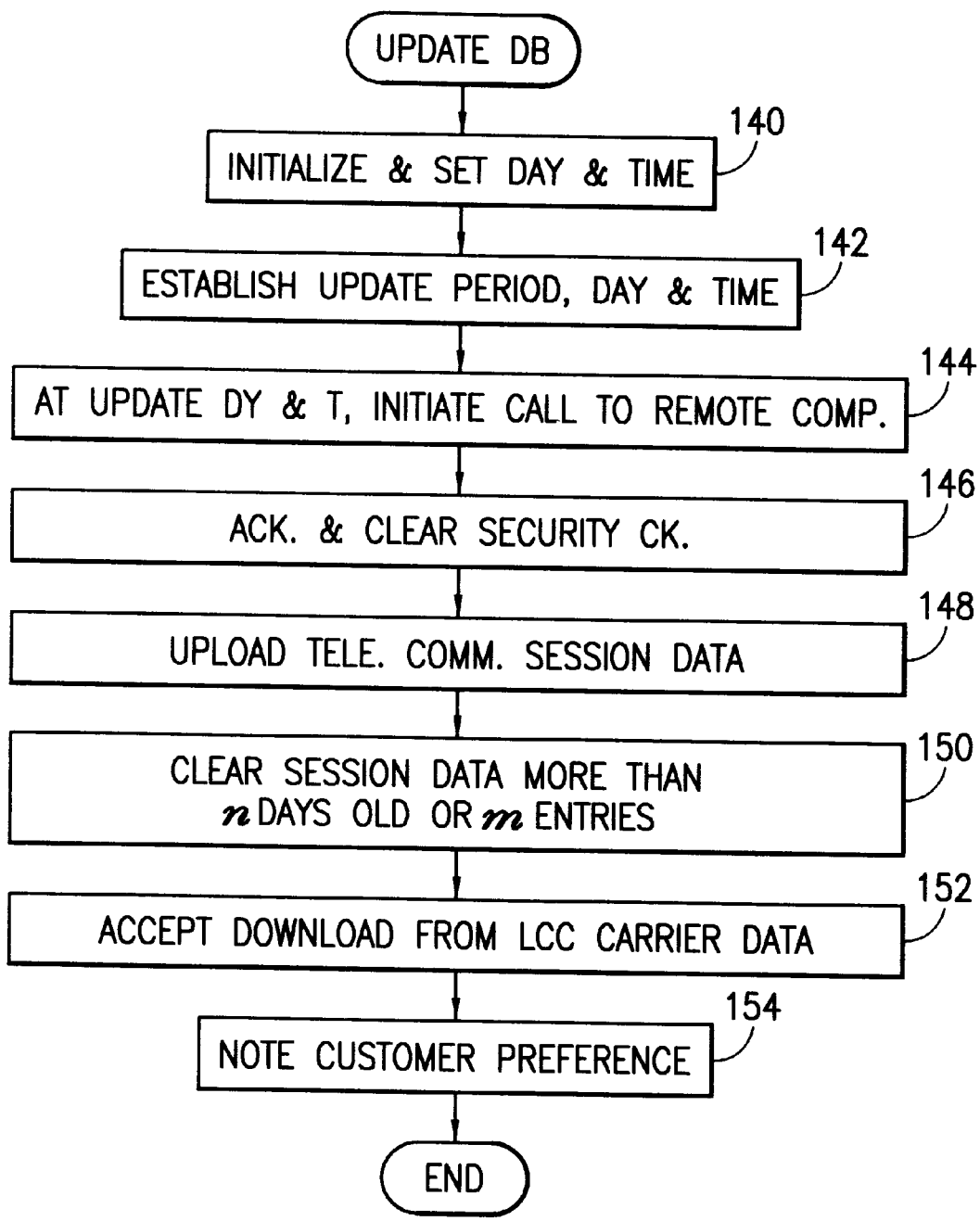
FIG. 6 diagrammatically illustrates a flow chart showing the update routine for the low cost call (LCC) carrier database (DB)

FIG. 6 diagrammatically illustrates a basic flow chart to update the LCC database. In step 140, the LCC database is initialized by setting the current day and the current time. As can be appreciated, the microprocessor 52 maintains a current date and time in order to properly locate the preferred LCC carrier or the least expensive LCC carrier from the LCC database. In step 142, the system is programmed, as an initial matter, to establish an update period, and the initial or first day and time for that update. For example, a typical update period may be every two weeks beginning twenty four hours after the installation of the programmable unit 14, 15 at the user's location. In step 144, the system determines the occurrence of the update day and time (or expiration of the initial update period, e.g., 24 hours), and initiates a call or a telecommunications session to the remotely disposed computer 30. Typically, this telecommunications session utilizes a UV telecommunications carrier previously selected by the manufacturer of programmable unit 14, 15 (i.e., the operator of computer 30).

A security clearance and acknowledgment occurs in step 146. In step 148, microprocessor 52 in programmable unit 14, 15, uploads telecommunication session data which represents all or a portion of the session data table set forth above. In step 150, some or all of the session data is cleared from the session data table. For example, data more than n (e.g., 14) days old could be deleted or entries greater than n (e.g., 50) entries may be deleted from the session data table. Alternatively, the memory could be a first in, first out FIFO memory which is self clearing. In step 152, microprocessor 52 and memory units 54, 56 accept downloaded data from remote computer 30 essentially updating or revising the LCC database table. This LCC database table is set forth above. In step 154, the LCC database table is annotated or changed to reflect any user or customer preferences previously stored or currently lodged and stored in remote computer system 30.

Figure 7:
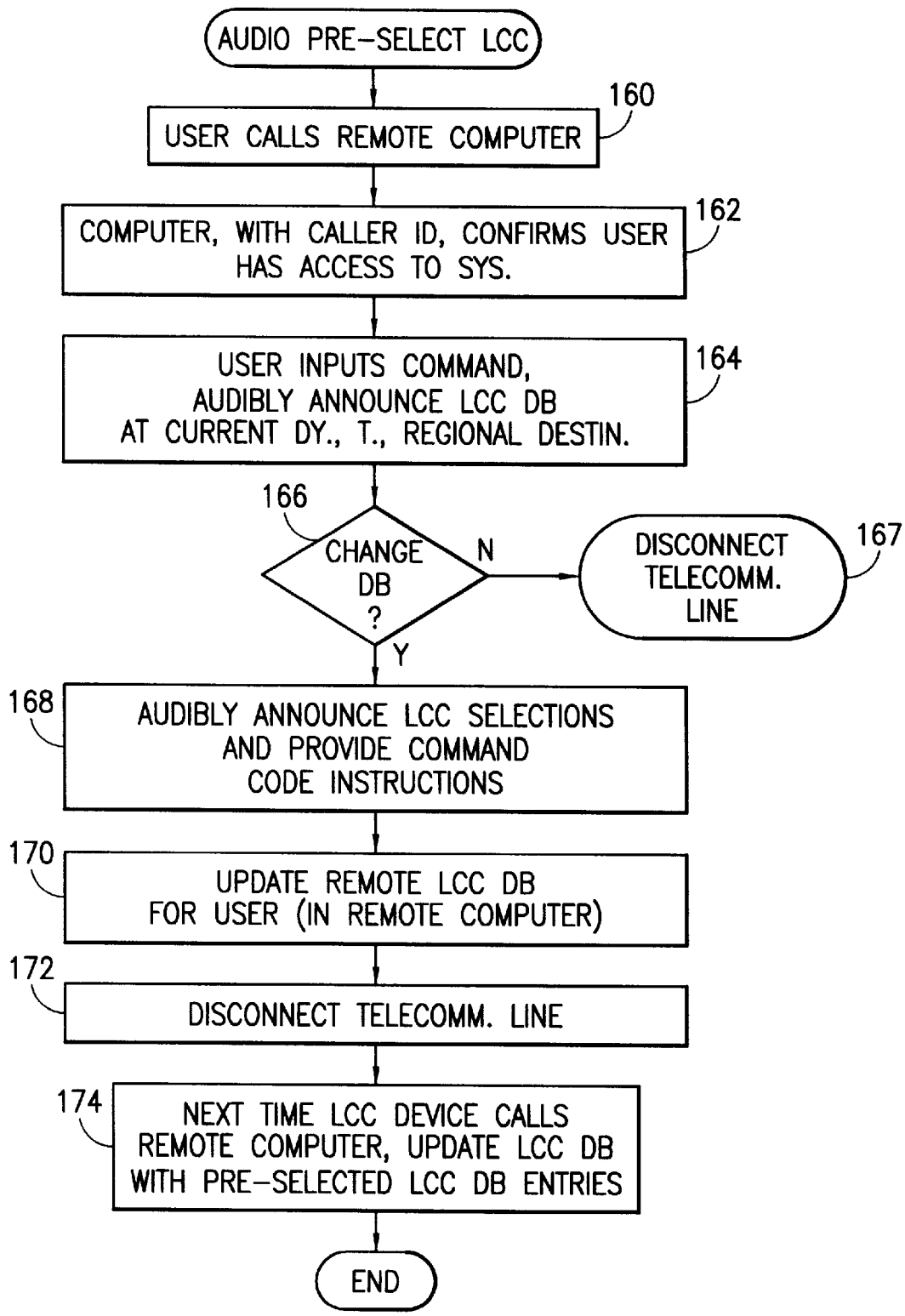
FIG. 7 diagrammatically illustrates a flow chart showing an audio preselection routine enabling the user to select a preferred low cost call carrier from the remotely disposed computer.

As discussed earlier herein, a major difference between the basic programmable unit 14 and the enhanced programmable unit 15 is display screen 41 (on enhanced unit 15) and user input elements 43, 45. However, with respect to the basic unit 14, a telecommunications routine can be established with the user and remote computer 30 such that the user can preselect his or her preferences for the LCC carrier. FIG. 7 diagrammatically illustrates the basic flow chart for this audio preselection of preferred LCC carriers. In step 160, the user calls remote computer 30 via initiating telecommunications device 12. At the remote computer in step 162, the user's caller id is confirmed against a user database in order to confirm that the user has access rights to the database in remote computer 30. Other security clearance routines may be used. In step 164, the user inputs a DTMF command and the remote computer audibly announces the user's ability to select preferred LCC carriers. Particularly, the remote computer 30 audibly announces, via the telecommunications link established with initiating telecommunications device 12, the available LCC carriers for the current day, the current time and certain regional destinations.

Decision step 166 inquires whether the user wants to change his or her preferred LCC carrier. If not, the NO branch is taken and the session ends and disconnects the telecommunications line in step 167. If the user wants to change the LCC database, the system takes the YES branch and executes step 168. In step 168, the remote computer system 30 audibly announces the LCC selections and provides command code instructions audibly to the user. In step 170, remote computer 30 decodes the DTMF signals input by the user at initiating telecommunications device 12 and updates the particular remote LCC database for that particular user. In step 172, remote computer 30 disconnects or takes the telecommunication telephone line off hook. In step 174, the next time programmable unit 14, 15 initiates that update database routine (FIG. 6), the LCC database in the programmable device 14, 15 is updated with the user preferences established by the audio preselect LCC carrier routine discussed in FIG. 7. Of course, rather than a audio session to enable the user to pre-select carriers, a session over the Internet can be executed. The steps are essentially the same except audio responses and prompts are converted to visual prompts and digital responses.

Figure 8:
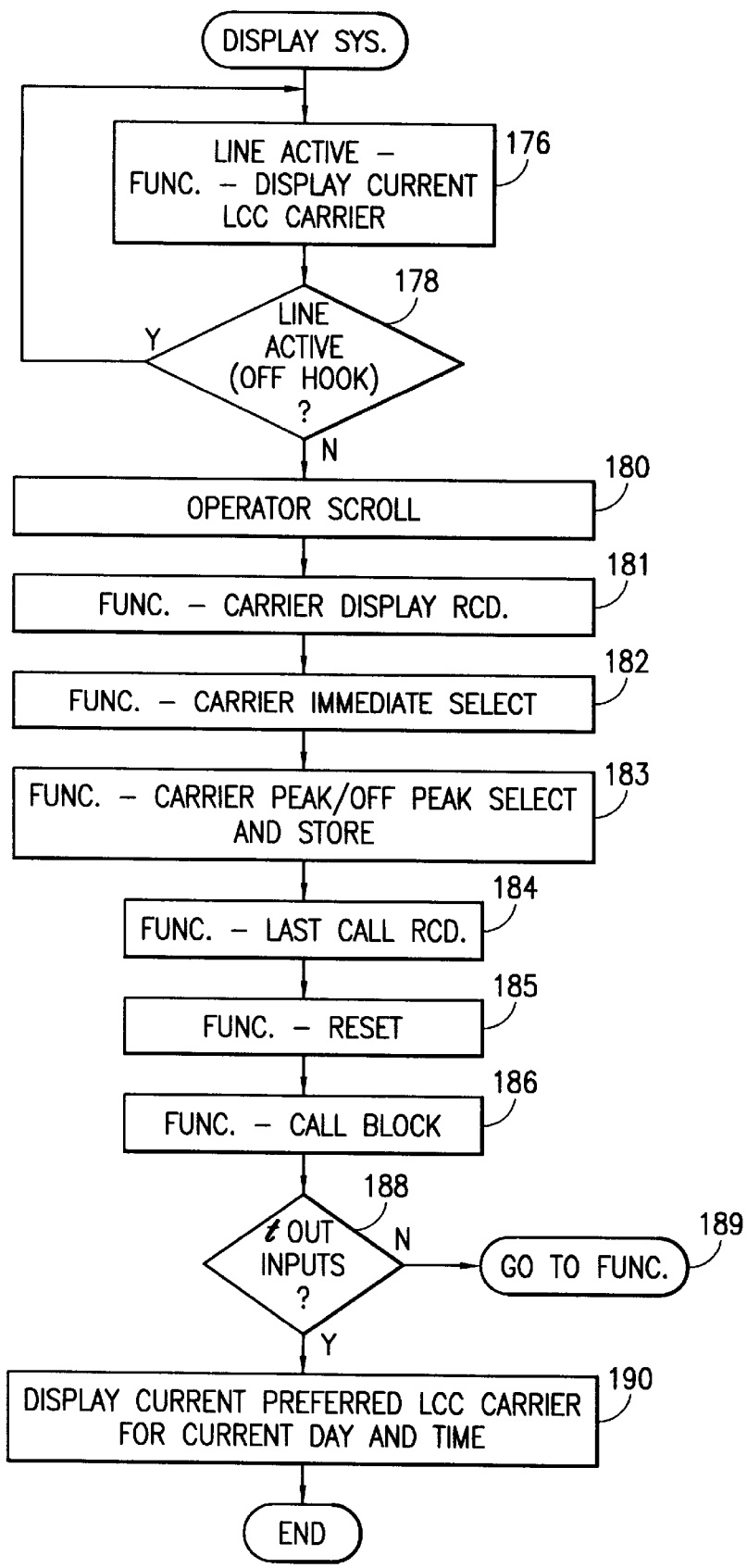
FIG. 8 diagrammatically illustrates a basic flow chart showing the display system routine.

FIG. 8 diagrammatically illustrates the basic flow chart elements for the display system routine. The display system routine, in practice, involves an interactive session displaying visual prompts in a scrolling manner to the user and accepting user inputs through input devices 43, 45. In FIG. 3, these input devices have been labeled as "function" and "select." By depressing the function switch or panel 43, the user can scroll through the functions discussed in display system routine in FIG. 8. These functions include line active function, carrier display record or LCC database function, immediate select of LCC carrier function, select carrier for peak and off peak time 12 frames, display last call record, reset function and block call function. If the user wants to select the visually displayed function, the user depresses or activates the SEL or select button or panel 45. This activates one of the function routines described in FIGS. 9–15. Other user inputs and visual prompts may be utilized to carry out the scope and spirit of the claimed invention.

The display routine, in a default mode, activates the line active function 176. Decision block 178 determines whether the telephone line is off hook and, if so, the YES branch is taken and the "display current LCC carrier" function is activated. If the NO branch is taken from decision step 178, this indicates that the telephone line is on hook signaling either the end of a telecommunications session or the absence of any open telecommunications channel. The NO branch leads to step 180 which permits the user or operator to scroll through the functions. These functions include display the LCC carrier or database 181; permit the user to immediately select an LCC carrier 182; permit the user to select an LCC carrier for a peak and an off peak time and store the preference in the LCC database in step 183; display last call record in step 184; reset database function which resets all the information in the LCC database in step 185; and, in step 186, block certain outbound calls from initiating telecommunications device 12. Of course, the functions need not be in the sequential order presented in FIG. 8 but may be reorganized to better present the information to the user or operator.

In step 188, the system determines whether the user has activated any user inputs 43, 45 within a certain time period. If the time out clock has not expired, the NO branch is taken and the system jumps in jump step 189 to the selected function. If the time out clock has expired, the YES branch is taken and the system activates step 190 which is "display the current preferred LCC carrier" (either the pre-selected carrier or the least expensive carrier) for the current day and time and the most common territory (pre-selected by the user, e.g., area code 202). For example, the most common territory may be the home state of device 12.

Figure 9:
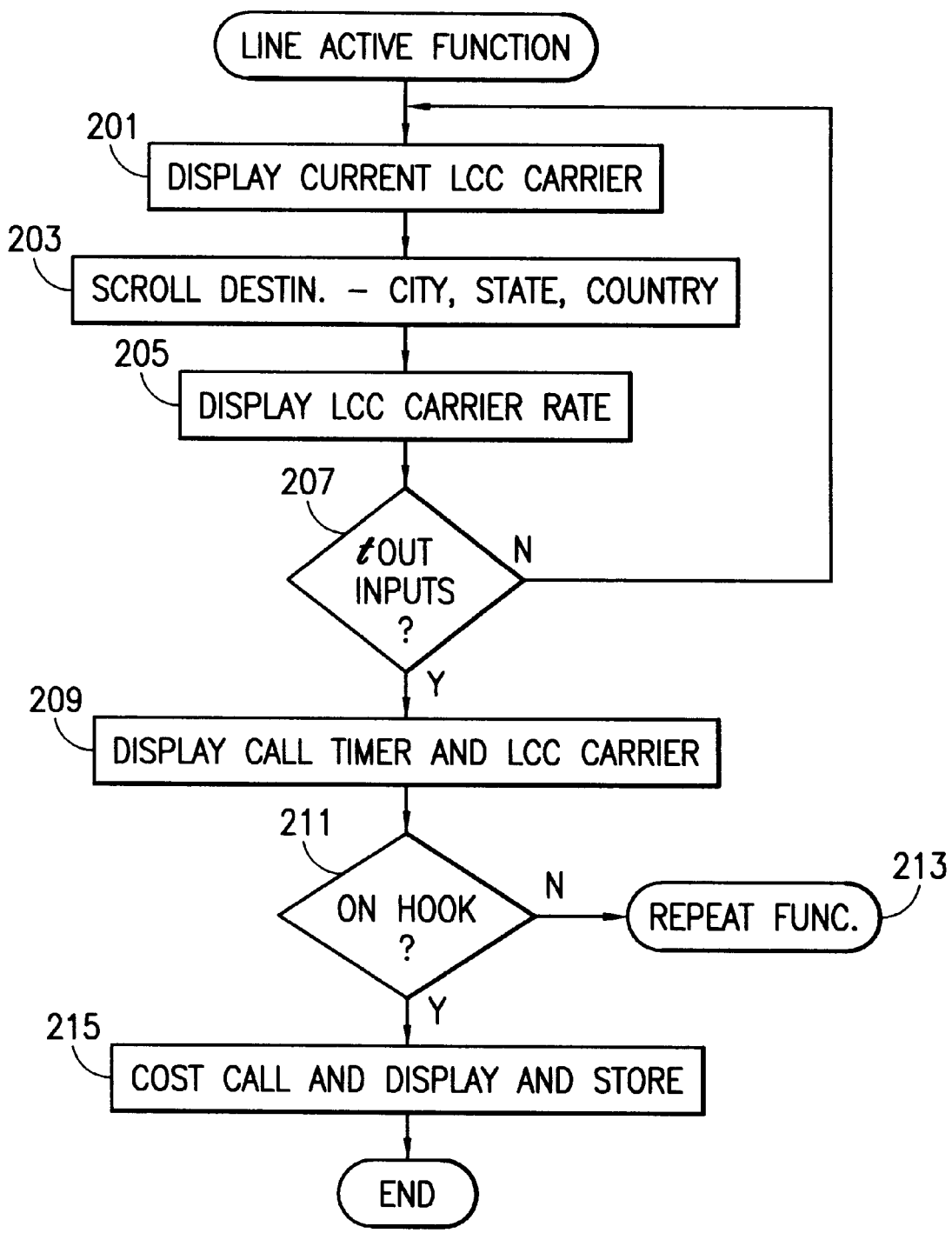
FIG. 9 diagrammatically illustrates the flow chart showing the line active function routine.

FIG. 9 diagrammatically illustrates the flow chart for the line active function 176 in FIG. 8. In step 201, the system displays the current LCC carrier for the particular time of day and the particular day of the week for the destination input by the user. In step 203, the system enables the user to scroll through the destination data. For example, if the user initially inputs a telephone number with area code 202, the system would show "Washington," then scroll to "D.C.," then scroll to "U.S." upon sequential depression of the SEL or select key. Destination data is visually presented by major cities, area codes, states or countries. The user selects destination data by depressing Sel. 45. In step 205, the system displays the preferred or the least expensive low cost call carrier and the rate for the destination city, area code, state and country. In decision step 207, the system determines whether a time out period has expired. If the time out period has not expired, the NO branch is taken and the system repeats beginning at step 201 which is, display the current preferred or least expensive low cost call (LCC) carrier at the current time and input destination. If a time out period has expired, the YES branch is taken and the system executes step 209 which is to display the call timer and the LCC carrier. Since the line is active (off hook), the timer continually is incremented. As discussed earlier, the call timer measures the duration of the current telecommunications session.

In decision step 211, the system determines whether the telephone line has gone on hook signaling the end of a telecommunications session. If not, the system in jump point 213 repeats the function and again initiates step 201, the display current LCC carrier. If the YES branch is taken from decision step 211 indicating that the telecommunications session has ended, the system executes step 215 which determines the amount of money or cost associated with the recently completed telecommunications session. In other words, the cost of the call is computed. The cost of the call is also displayed and stored in step 215. The storage of data is explained earlier at step 122.

Figure 10:
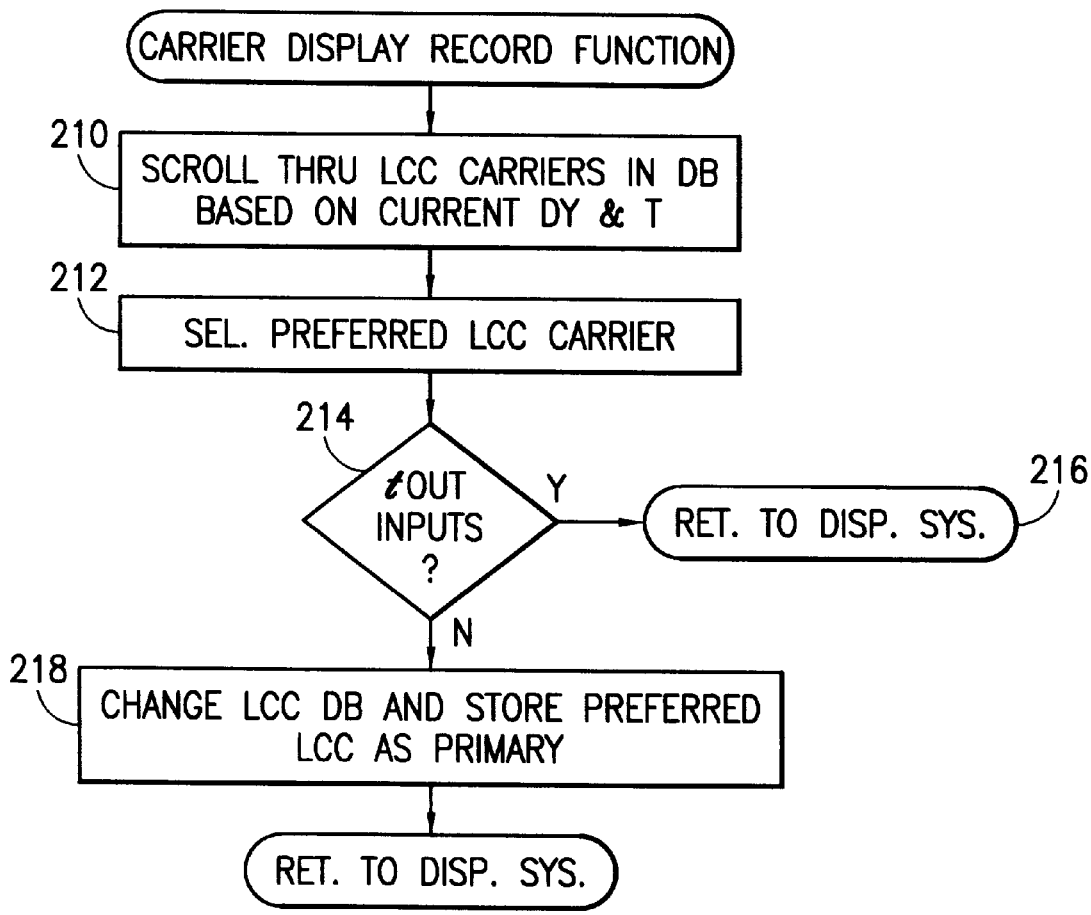
FIG. 10 diagrammatically illustrates the LCC carrier "display record" function routine.

FIG. 10 diagrammatically illustrates the major elements of the flow chart regarding the "carrier display record" function which essentially enables the user to view the LCC database table. In step 210, the system permits the user to scroll through various LCC carriers in the LCC database table based on the current day and current time of day (T). In step 212, the system permits the user to select a preferred or a preference LCC carrier. In step 214, the system determines whether a time out period has expired. If the time out has expired, the YES branch is taken and the system in jump step 216 returns to the display system routine shown in FIG. 8. If the time out has not expired, the NO branch is taken and in step 218, the system changes the LCC database and stores the preferred LCC as the primary or preferred carrier for the particular day and time period. The following display table routine provides some characteristics for the LCC database "display record" routine.

Display Routine Table

Scroll
    at current time, for U.S. region:
        preferred LCC carrier (if p-set) and rate
        lowest LCC carrier and rate
        2nd lowest LCC carrier and rate
        3rd lowest LCC carrier and rate
        nth lowest LCC carrier and rate
    at current time, for home state region:
        preferred LCC carrier (if p-set)
        lowest LCC carrier
        nth lowest LCC carrier
    at peak time, for U.S.:
        preferred LCC carrier (if p-set)
        lowest LCC carrier
        nth lowest LCC carrier
    at peak time, for home state:
        preferred LCC carrier (if p-set)
        lowest LCC carrier
        nth lowest LCC carrier
    at off-peak time, for U.S.:
        preferred LCC carrier (if p-set)
        lowest LCC carrier
        nth lowest LCC carrier
    at off-peak time, for home state:
        preferred LCC carrier (if p-set)
        lowest LCC carrier
        nth lowest LCC carrier
    at current time, for ABC country:
        preferred LCC carrier (if p-set)
        lowest LCC carrier
        nth lowest LCC carrier
    at peak, then off-peak, for ABC country:
        preferred LCC carrier (if p-set)
        lowest LCC carrier
        nth lowest LCC carrier The display table routine enables the user to scroll though the LCC database in an organized manner. At the first level, the user is shown his or her preferred LCC carrier for the most common region, in this example, the United States. If the user has not selected a preferred LCC carrier (that is, no p-set for the U.S.), the database and routine shows the least expensive LCC carrier, then the next available, slightly higher priced LCC carrier, the third available carrier and then the nth least expensive LCC carrier. At the next level, the user is visually shown for the current time, for a different territory, that is, for the state region, the preferred LCC carrier, then the lowest or least expensive LCC carrier and then the next available nth lowest LCC carrier. This system then repeats itself for the peak time for the current day for the U.S. showing the preferred LCC carrier, lowest LCC carrier, next lowest LCC carrier and the nth lowest LCC carrier. The system further displays the LCC carrier list for the peak time period for the state region. Alternatively, the display table routine could utilize area codes rather than state codes. This display shows preferred LCC, lowest LCC, next lowest LCC, etc. Thereafter, the display LCC DB table system shows for an off peak time, for the current day of the calls may be made with the immediately selected carrier. At the termination of each call, the clock is reset and the user has 10 minutes to place another call. In step 230, the system determines whether a longer time out period has expired, for example, decision step 230 determines whether ten minutes has expired from the temporary storage of the LCC carrier. If not, the system in jump point 231 goes through any other functions that the operator may select. This includes initiating a call and activating the line active function shown in FIG. 9. If the time has expired, that is, greater than ten minutes, the YES branch is taken and the system executes step 232 which restores the LCC database to its previous condition prior to the immediate selection of an LCC carrier.

Figure 12:
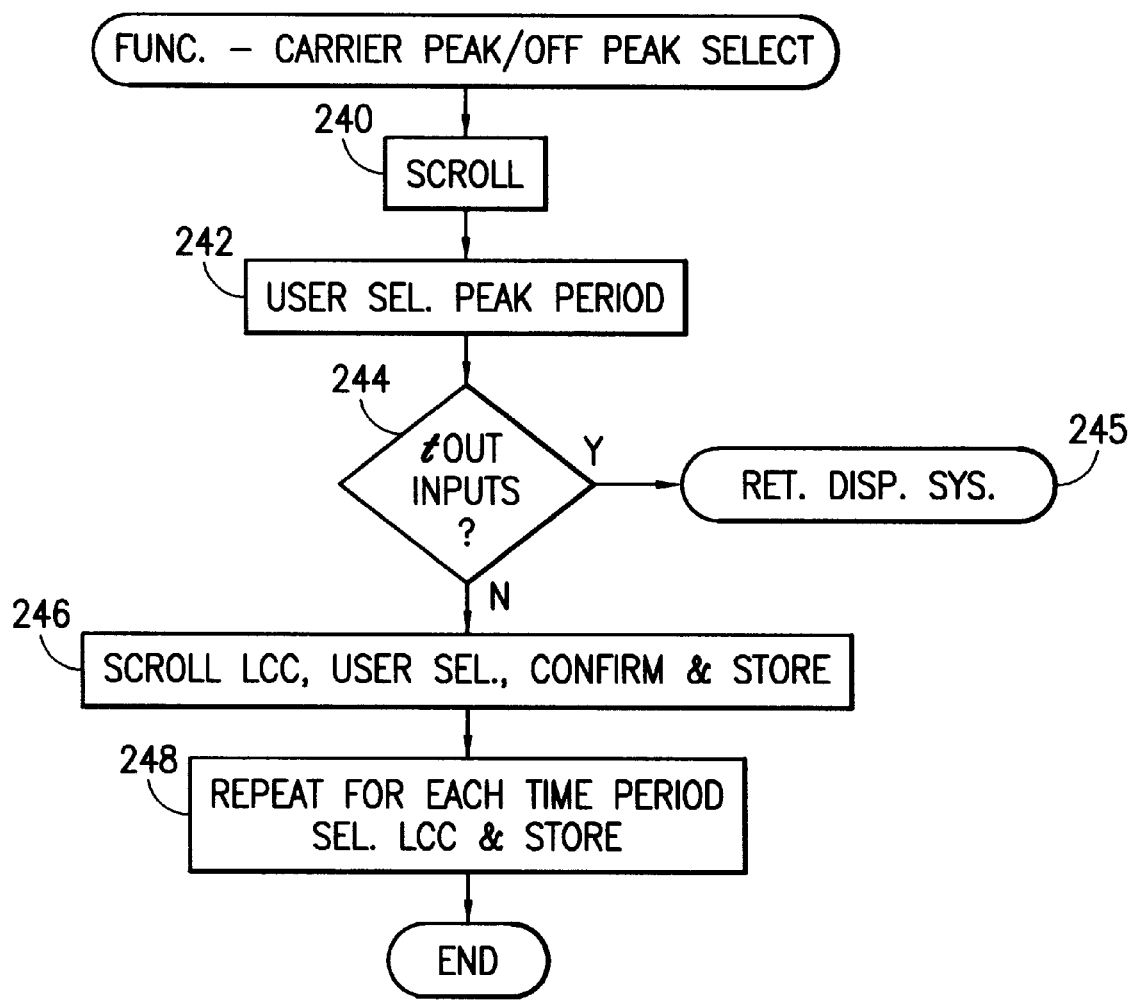
FIG. 12 diagrammatically illustrates the functional routine for the user to select the peak and off peak low cost call carrier or preferred carrier.

FIG. 12 diagrammatically illustrates major elements of a flow chart for the carrier selection for peak and off peak periods. In step 240, the system permits the user to scroll through the peak period table shown below.

| | Peak/Off-Peak/Extreme Off-Peak Period Table | | | | | | |
|---|---|---|---|---|---|---|---|
| | Mon. | Tues. | Wed. | Thurs. | Fri. | Sat. | Sun. |
| (a) | 6 AM–6 PM | 6 AM–6 PM | 6 AM–6 PM | 6 AM–6 PM | 6 AM–6 PM | 6 AM–6 PM | 6 AM–6 PM |
| (b) | 6 PM–11 PM | 6 PM–11 PM | 6 PM–11 PM | 6 PM–11 PM | 6 PM–11 PM | 6 PM–11 PM | 6 PM–11 PM |
| (c) | 11 PM–6 AM | 11 PM–6 AM | 11 PM–6 AM | 11 PM–6 AM | 11 PM–6 AM | 11 PM–6 AM | 11 PM–6 AM | week, for the U.S., then shows the off peak LCC list for the current day of the week for the state. Thereafter, the display LCC table routine shows the LCC carrier list for the current time, current day of the week for certain enumerated countries. A sophisticated system would list a respectable number of countries (50+ countries) and enable the user to select the country that he or she is interested in. The system would then display the LCC database table for the peak LCC list, then the off peak LCC list for the selected country.

The display LCC DB table routine discussed above can be integrated into the carrier display record function set forth in FIG. 10. Other sequential presentations of the stored LCC DB or table are available and are meant to be included in the concepts disclosed herein.

Figure 11:
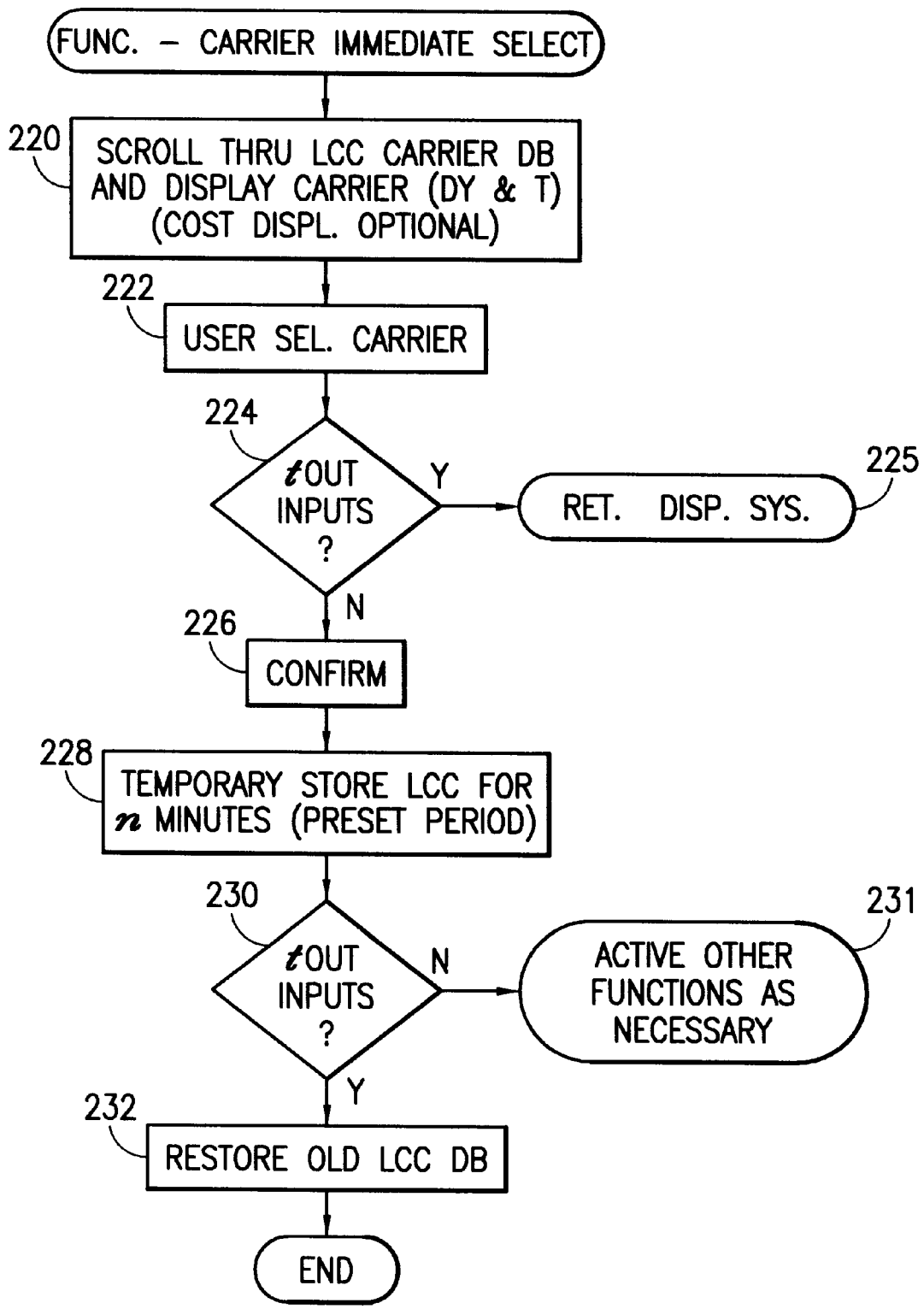
FIG. 11 diagrammatically illustrates the functional routine for the "select immediate carrier" routine.

FIG. 11 diagrammatically shows the major functional elements of a flow chart for the carrier "immediate select" function. In this function, the user can select via function button 43 and selection input 45 a particular LCC carrier for a telecommunications session which will be initiated within an immediately following predetermined period of time (for example, ten minutes). In step 220, the user is permitted to scroll through the LCC carrier database. See the scroll system described earlier herein. In the LCC carrier database, the current day, day of the week and current time is used to locate the LCC carriers for the current day and the current time. Rates are displayed with the carrier data. In step 222, the user selects a particular LCC carrier. In step 224, a time out circuit determines whether the time has expired. If the time has expired, the YES branch is taken and the system returns via jump step 225 to the display system routine in FIG. 8. If the NO branch is taken and the time clock has not expired, the system in step 226 confirms the immediate LCC carrier selection by the user. In step 228, the system temporarily stores the selected LCC carrier for n minutes. In a preferred embodiment, n equals about ten minutes. However, sophisticated programmable devices could enable the user to select greater or small lengths of time for that immediately selected LCC carrier. In this manner, multiple The peak period table may be configured as a three dimensional table wherein the user selects the day of the week and daily time periods a, b or c generally corresponding to peak periods, off peak periods and extreme off peak periods. Also, the user is shown for each period a, b and c, the carrier, IDR) the rate and the expiration date of the carrier rate. This display of end or expiration date data is optional. In step 242, the user selects a particular period whether it's the a period, b period or c period. Decision step 244 determines whether a time out has occurred. If the time out has occurred, the system takes the YES branch and encounters jump step return to display system 8 in step 245. Display system routine is discussed above in FIG. 8. If the time out has not expired, the NO branch is taken and the system executes step 246. In step 246, the system scrolls through various LCC carriers, enables the user to select a particular LCC carrier for a particular peak time, off peak time or extreme off peak time, confirms the selection and stores it as a preference in the LCC database table. In step 248, the system repeats the process for each time period, each day of the week and stores the preferred LCC carrier for that time, day of the week and date. The peak, off peak and extreme off peak time periods set forth above are only exemplary.

Figure 13:
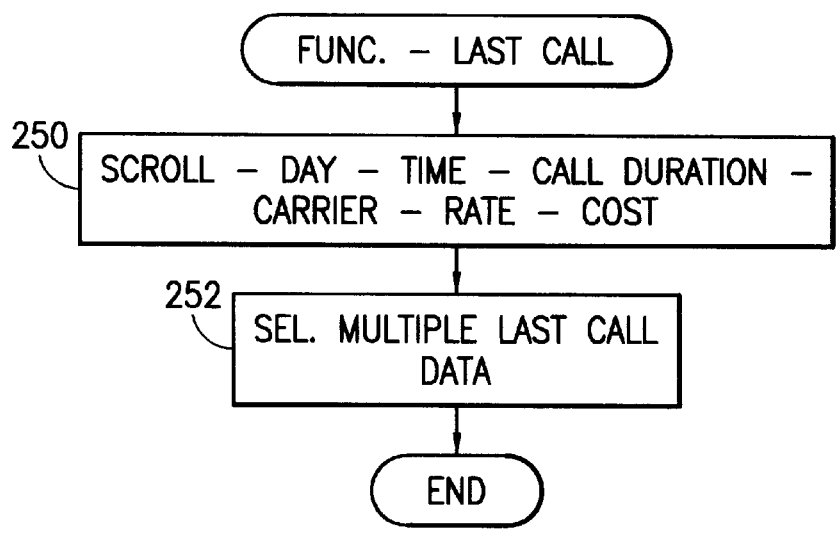
FIG. 13 diagrammatically illustrates a simple routine to display the cost of the last call made by the user via the programmable device.

FIG. 13 diagrammatically illustrates the simple, essential, flow chart elements of the last call function. In step 250, the user is permitted to scroll through the call session data table based on day, time of call, call duration, LCC carrier, rate and cost of the call. This scrolling information is provided from the session data table discussed earlier. In addition, step 250 may reveal the destination telephone number and, if available, the caller id or name of the called party. In step 252, the system enables the user to select multiple last call data in order to determine additional information that may not be initially displayed during the first selection. In other words, the size of display screen 41 may be small such that it only shows the date and time of call and call duration. The user would then scroll through the remaining data in the call record stored in the session data table. If the user wants additional information for the call record, the user strikes the select button 45 and additional information such as LCC carrier, rate, destination and cost of call would be displayed to the user. Further, the user may also be shown destination caller id and call identification from the session data table.

Figure 14:
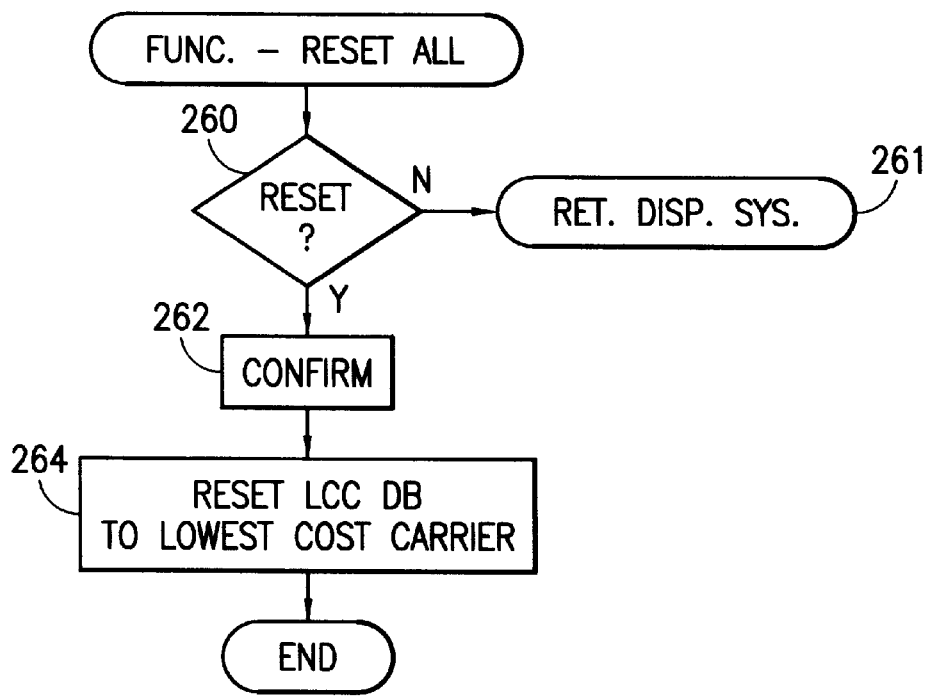
FIG. 14 diagrammatically illustrates a simple flow chart enabling the user to reset the low cost call database.

FIG. 14 diagrammatically illustrates the major functional elements of the flow chart for the "reset all" function. Decision step 260 requests whether the user wants to reset the entire LCC database and remove all preferences. If the NO branch is taken, the system returns to the display system routine in step 261 which returns the system back to the flow chart shown in FIG. 8. If the YES branch is taken and the user wants to reset the preferences in the LCC database, the system confirms this selection in step 262 and, in step 264 resets and removes all preferences from the LCC database. In this instance, the "preferred" carrier would always be the least expensive carrier.

Figure 15:
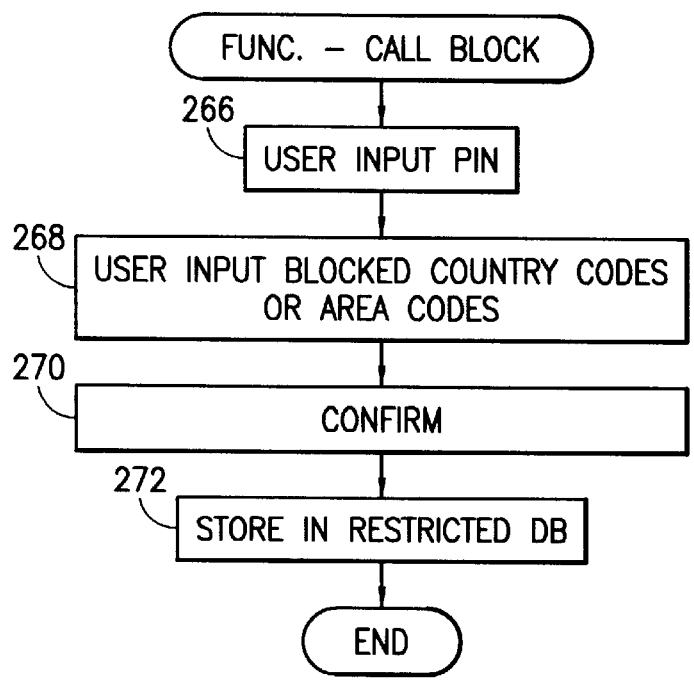
FIG. 15 diagrammatically illustrates a simple flow chart enabling the user to block calls from the initiating telecommunications device thereby blocking certain calls to countries or area codes.

In FIG. 15, the call block function is shown. The flow chart in FIG. 15 shows, in step 266, that the user must input a personal identification number or PIN number or code command in order to block outgoing calls from the telecommunications initiating device 12. In step 268, the user selects country codes or area codes which are blocked. In step 270, the system confirms the blocked country codes or area codes. In step 272, this information is stored in a restricted database. This restricted database would be keyed to step 92 in FIG. 4*a* the LCC routine. If a blocked country code or blocked area code was detected in step 92, the system generates an error signal on display screen 41 thereby indicating to the user that he or she is not permitted to initiate a telecommunications session to that country or area code.

Figure 16:
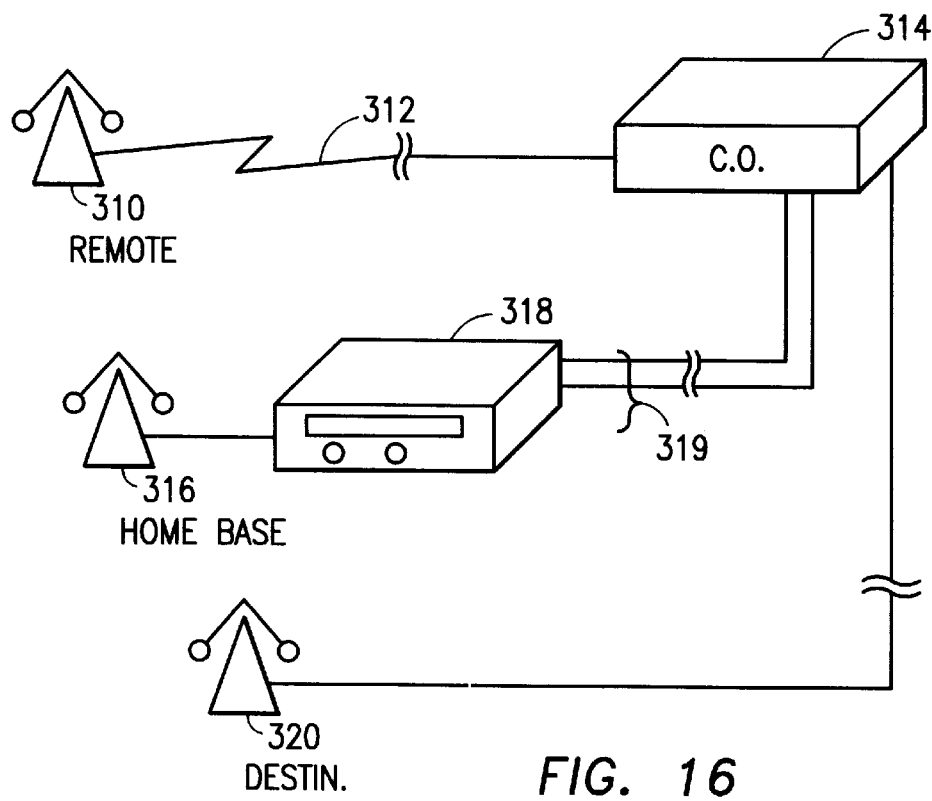
FIG. 16 diagrammatically illustrates a telecommunications system diagram showing the three way conference call system between a first remote telecommunications device, an initiating telecommunications device and a remote destination telecommunications device via one of a preferred low cost call carrier or a least expensive low cost call carrier.

FIG. 16 diagrammatically illustrates the conference call system for the present invention. In general, the conference call features permit a caller from a remote telecommunications device 310, to call into the home base or "initiating telecommunications" device 316 and the initiating telecommunications device, in conjunction with the programmable unit, activates a conference call with C.O. 314, selects a LCC carrier and establishes a telecommunications link between the remote telecommunications device 310, the initiating telecommunications device 316 and a remote destination telecommunications device 320. FIG. 16 diagrammatically illustrates this telecommunications system. Remote telecommunications device 310 is connected via telecommunications line 312 to central office 314 as well as other telecommunications networks not shown in FIG. 16. Central office 314 is connected to the home base or initiating telecommunications device 316 via programmable unit 318. Programmable unit 318 is connected back to central office 314 via a telecommunications link 319 that permits conference calling. Line 319 is similar to second telecommunications line 20 in FIG. 1 but is designated differently herein to show conference call capabilities. Central office 314, via one or more telecommunications networks (not shown), is connected to destination telecommunications device 320.

Figure 17:
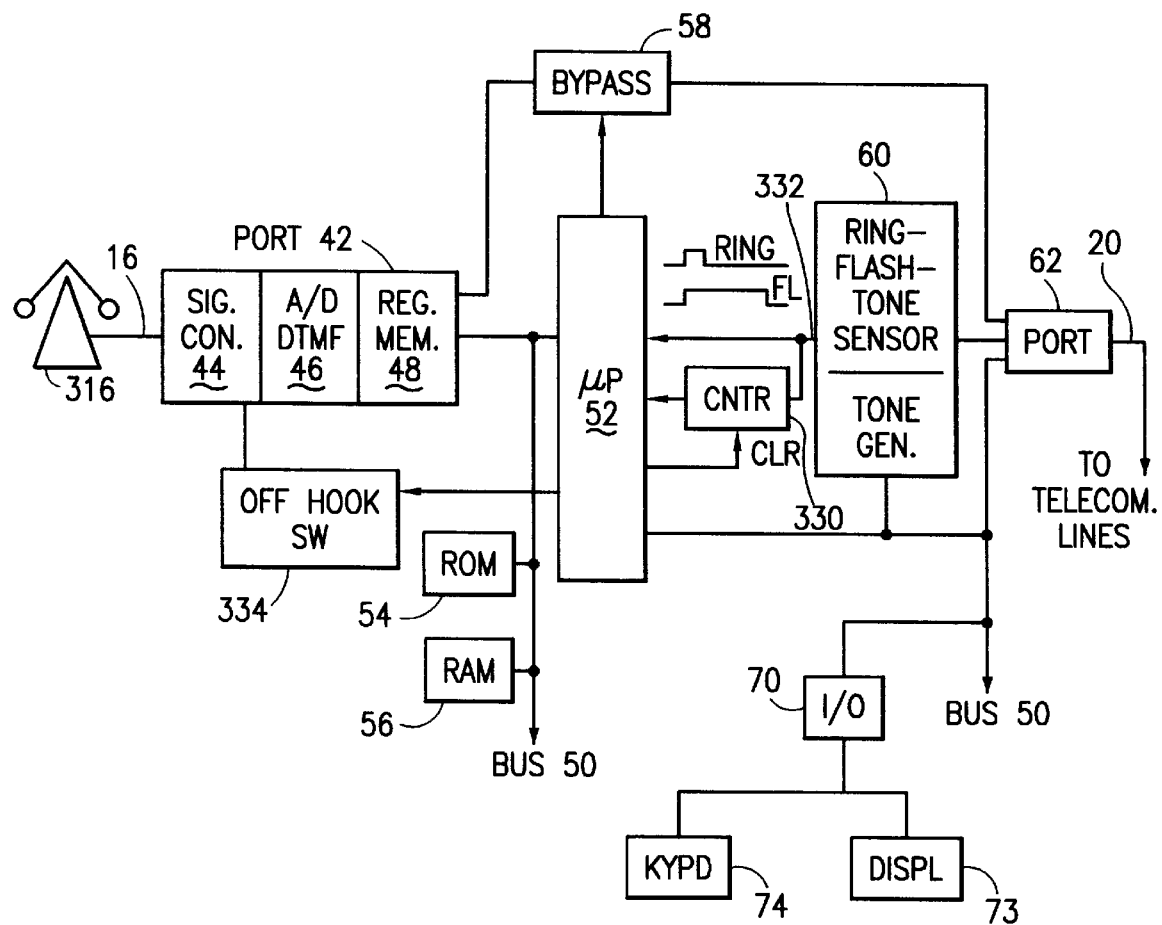
FIG. 17 diagrammatically illustrates a block diagram showing the functional components of the conference call-programmable apparatus.

FIG. 17 diagrammatically illustrates the block diagram for conference call programmable unit 318. Similar numerals designate similar items in FIGS. 2 and 17. Since the programmable device must be electronically configured to identify a ring signal inbound from the remote telecommunications device 310 as compared with a flash signal from remote device 310, the system includes a counter 330 which counts the rings or counts the time duration of the flash (fl) signal on line 332 from the output of ring-flash-tone sensor 60. Alternatively, the ring sensor may have separate outputs generating command signals, unique to the ring signal, to the microprocessor 52 as compared with the flash signal command sent to the processor 52. Further, after receiving the flash signal from the remote telecommunications device 310, microprocessor 52 and unit 318 must then generate a tone to the central office 314 from tone generator 60 indicating the initiation of conference call. In order to do this, the system must generate an off hook condition on the telecommunications line. To accomplish this, an off hook switch 334 is provided feeding into port 42. This off hook switch generates an off hook condition which is passed through bypass switch 58 to port 62 and ultimately to central office 314.

Figure 18A:
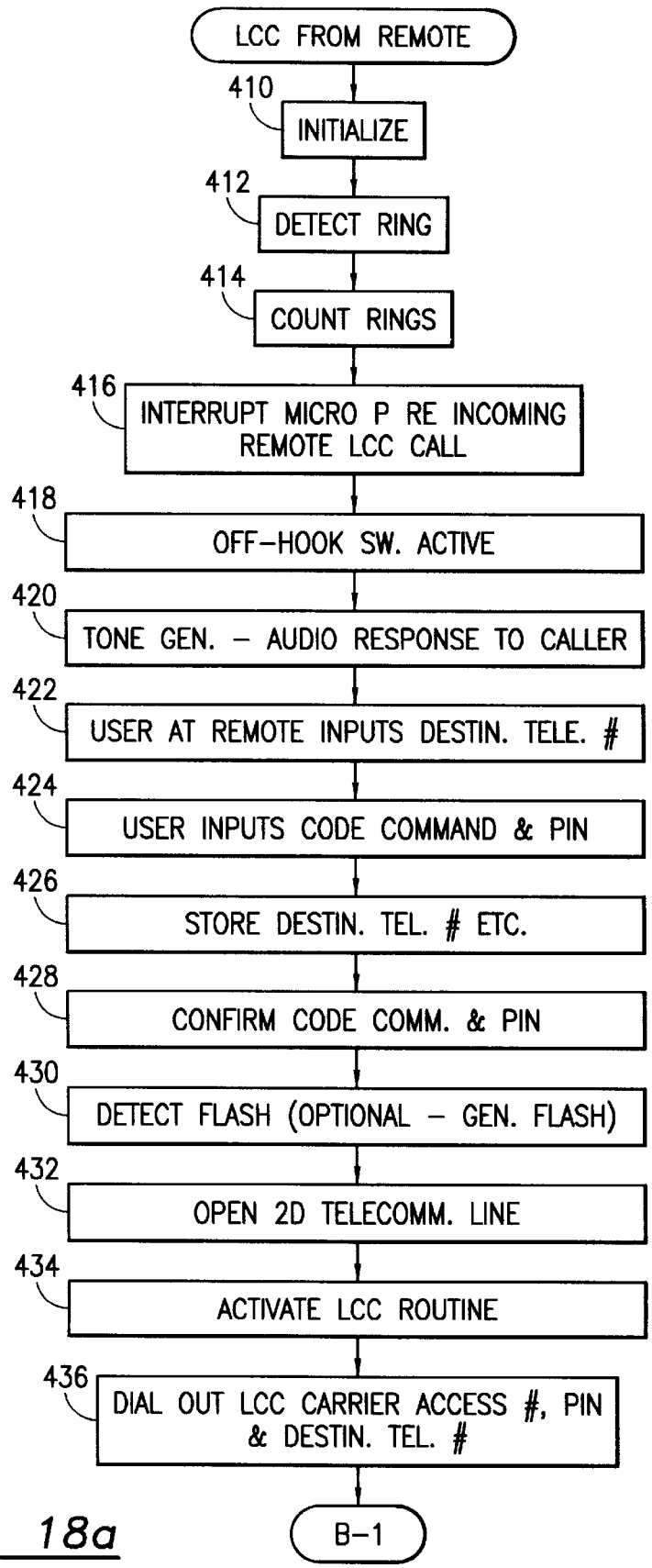
FIGS. 18a and 18b diagrammatically illustrate a flow chart for the low cost call routine from the remote telecommunications device.
Figure 18B:
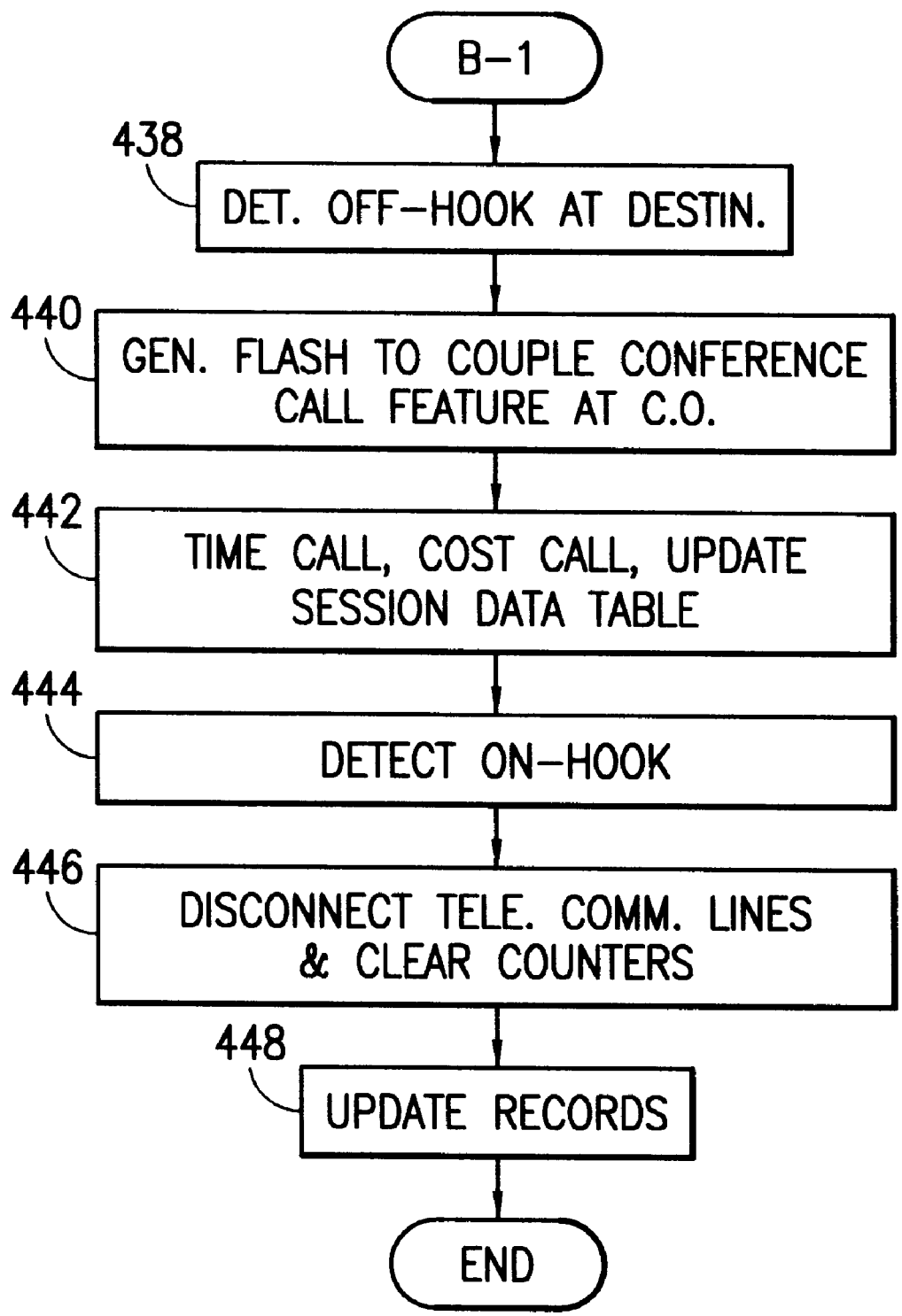

FIGS. 18*a* and 18*b* diagrammatically illustrate the major functional elements of the low cost call carrier routine from the remote. This is the conference call LCC routine. In step 410, the system is initialized. In step 412, the system detects a ring initiated from remote telecommunications device 310. In step 414, the system detects the number of rings. Upon the receipt of the number of rings counted by counter 30, a command signal from counter 330 is applied to microprocessor 52. In step 416, the microprocessor is "woken up" and recognizes the incoming call from remote telecommunications unit 310. The microprocessor then activates the off hook switch 334 in step 418. In step 420, the microprocessor activates tone generator 60 and provides an audio or tone response to the caller at remote telecommunication device 310. In step 422, the user at remote telecommunications device 310 recognizes this audio response or prompt and inputs a destination telephone number, and in step 424 inputs a command code and a unique PIN number which notifies the unit of his or her clearance code and activates microprocessor 52 to complete the conference call.

In step 426, the programmable unit stores the destination telephone number and all other pertinent information in one or more memory units. In step 428, the system confirms the user input code command and PIN. Step 430 detects a flash signal from the remote telecommunications unit 310 or, alternatively, generates a flash signal to that remote unit. This signals the "conference call wait period" to the user at remote unit 310. In step 432, the programmable unit opens another channel on the second telecommunications line by generating the specific tone to central office 314. Essentially, the programmable unit 318 places remote telecommunications unit 310 on "hold" and initiates a conference call through central office 314 to destination telecommunications 320. Prior to establishing that telecommunications session in step 434, the system activates the LCC database routine. This routine locates the preferred LCC carrier or the least expensive LCC carrier, obtains the carrier access number and the PIN number and forms a signal packet including the destination telephone number. This function is shown in step 436. The system then jumps in jump point B-1 to FIG. 18*b*.

In step 438, the system sends the signal packet to the selected carrier and destination and then detects an off hook condition at the destination telecommunication device 320. In step 440, the programmable unit generates a flash or a predetermined tone to central office 314 which "conferences in" or connects the destination telecommunications device 320 with the remote telecommunications device 310 and the programmable unit 318 (acting as the initiating telecommunications device 316) over the selected LCC carrier. In step 442, the programmable device records the duration of the call, computes the cost of the call, and updates the session data table. In step 444, the system detects an on hook condition based upon either the remote telecommunications device 310 going on hook or the destination telecommunications device 320 going on hook. In step 446, the programmable device disconnects the telecommunications lines and clears the counters. In step 448, the system updates its session data table records.

Figure 19:
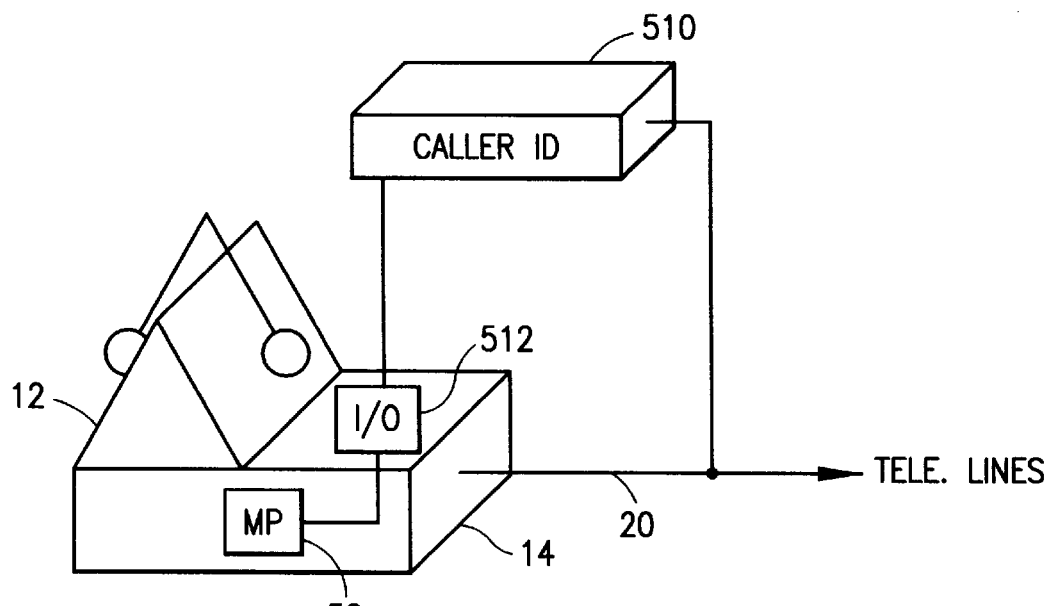
FIG. 19 diagrammatically illustrates a block diagram showing the integration of the programmable apparatus into an initiating telecommunications device and also a programmable device linked to a caller id or identification unit.
Figure 20:
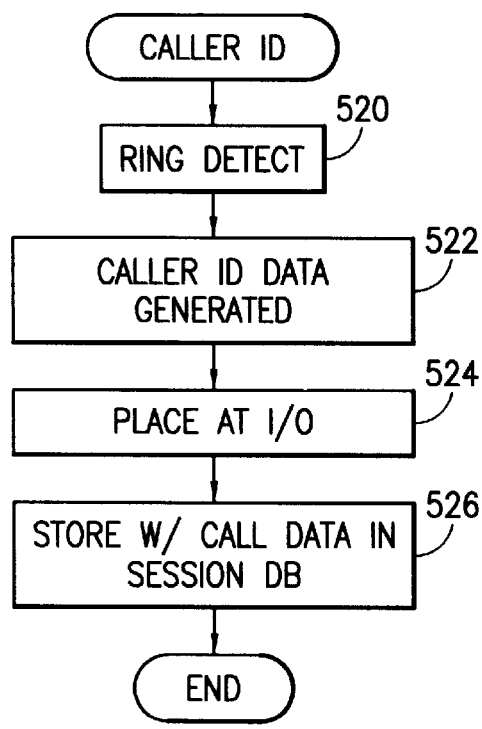
FIG. 20 diagrammatically illustrates a simple flow chart showing the integration of caller id data into the cost of call or telecommunications session data table.

FIGS. 19 and 20 diagrammatically illustrate the programmable device incorporated in telecommunications device 14 and associated with a caller id unit 510.

In FIG. 19, the programmable unit 14 is physically connected with initiating telecommunications device 12. However, there must be access by the programmable unit 14 to the outbound telephone lines in initiating telecommunications device 12. Outbound telecommunication sessions are connected via second telecommunications line 20. In FIG. 19, the system also includes caller id unit 510 which is electrically connected to second telecommunications lines 20. The electronic data output from caller id unit 510 is applied to input/output device 512 and ultimately applied to microprocessor 52. Other components of the programmable 14 are discussed above in connection with FIGS. 2, 3 and 17.

FIG. 20 diagrammatically illustrates the major functional elements of the flow chart for the caller id routine. In step 520, the caller id in detects an incoming ring on second telecommunications line 20. In step 522, the caller id unit 510 generates caller id data showing the phone number of the calling party and possibly the name of the calling party. In step 524, the caller id unit 510 outputs this digital information and places the data in input/output device 512. Microprocessor 52, when receiving the appropriate flag on the bus, stores that caller id data in the session data table in step 526.

Returning to FIG. 1, the report 34 printed by printer 32 may include a great deal of information specifically obtained from the session data table and uploaded from programmable unit 14 to remotely disposed computer 30. The following report data provides some exemplary information.

| Report Table |
|---|
| customer name, address and billing phone number |
| call date, call time 9 AM/PM) |
| length of call (call time) |
| destination telephone number |
| carrier, rate |
| cost of call |

The claims appended hereto are meant to cover modifications and changes within the scope and spirit of the present invention.

What is claimed is:

1. A programmable apparatus for routing telephone communications through a preferred low cost call carrier to a telecommunications device at a destination, said programmable apparatus connected, via a local telephone telecommunications line, to an initiating telecommunications device, which initiates the telephone communications session by generating a dual tone multifrequency (DTMF) signal representative of a destination telephone number, said programmable apparatus connected to a second telephone telecommunications line which is coupled to a plurality of telecommunications carriers, said programmable apparatus periodically coupled via a telecommunications link to a remotely disposed computer, said programmable apparatus comprising:

input and output devices coupled to said local telecommunications line and said second telecommunications line, said input and output devices having means to convert said DTMF signals into digital signals and digital signals into DTMF signals, said input and output devices respectively configured as a first and a second port, said first port handling signal communications between said initiating telecommunications device and processor and second port handling signal communications on said second telephone telecommunications line;

said processer coupled to a memory and also coupled to said input and output devices via said first and second ports;

a bus coupling said processor, said memory and said first and second ports together;

a database stored in said memory and containing information, including access telephone numbers, clearance code data, cost of call rate data for specific destinations, day, date and time of day, all for said plurality of telecommunications carriers;

said processor having means, linked to said memory, for decoding said destination telephone number and obtaining a respective access number and clearance code data for one of a preference low cost call carrier and a least expensive low cost call carrier from said database based upon a one of corresponding pre-selected user preference and a least expensive cost of call rate data for a current day, date, time of day and destination;

said processor having means, linked to said memory, for compiling said respective access number, clearance code data and destination telephone number into a signal packet and sending said signal packet to said second telecommunications line via said input and output devices and said second port thereby establishing a telecommunications link between said initiating telecommunications device and said destination telecommunications device over one of said preference low cost call carrier and said least expensive low cost call carrier;

said processor having an update timer and means, linked to said memory, for opening said telecommunications link with said remotely disposed computer based upon said update timer; and, said processor having means, linked to said memory, for revising said database information based upon update information downloaded from said remotely disposed computer regarding said plurality of telecommunications carriers; and wherein said input and output devices, said processor and said memory draw power from said telephone telecommunications line and said first and second ports each have a register memory which holds said converted DTMF signals in said register memory prior to said processor drawing power from said telephone telecommunications line.

2. A programmable apparatus as claimed in claim 1 wherein said second telecommunications line is coupled to said plurality of telecommunications carriers via a central telecommunications office.

3. A programmable apparatus as claimed in claim 2 wherein said local telephone telecommunications line is a first telephone line which is only coupled to said central office via said programmable apparatus.

4. A programmable apparatus as claimed in claim 1 wherein said processor includes means, linked to said memory, for capturing and storing in said memory a time duration of each call over said one of said preference low cost call carrier and said least expensive low cost call carrier.

5. A programmable apparatus as claimed in claim 4 including means for storing, in a call timer database in said memory, data representing said time duration and said current day, date, time of day, destination telephone number and data representing the utilized one of said preference low cost call carrier and said least expensive low cost call carrier.

6. A programmable apparatus as claimed in claim 5 wherein said processor includes means, linked to said memory, for uploading the call timer database data to said remotely disposed computer during the corresponding open telecommunications link.

7. A programmable apparatus as claimed in claim 1 wherein said processor includes means, linked to said memory, for determining when a time to connect to said one of said preference low cost call carrier and said least expensive low cost call carrier exceeds a predetermined period and, in such event, for selecting, compiling and establishing a new telecommunications link with a low cost call carrier having a next available, least expensive cost of call rate for said current day, date, time of day and destination.

8. A programmable apparatus as claimed in claim 6 wherein said processor includes means, linked to said memory, for determining when a time to connect to said one of said preference low cost call carrier and said least expensive low cost call carrier exceeds a predetermined period and, in such event, for selecting, compiling and establishing a new telecommunications link with a low cost call carrier having a next available, least expensive cost of call rate for said current day, date, time of day and destination.

9. A programmable apparatus as claimed in claim 1 wherein said update timer activates said means for opening the update telecommunications link during extreme off-peak telecommunications hours.

10. A programmable apparatus as claimed in claim 1 including a display and a user actuatable input device, both coupled to said processor, said processor having means, linked to said memory, for accepting user inputs, via said user input device, as prompted by visual data presented on said display.

11. A programmable apparatus as claimed in claim 10 wherein said processor having means, linked to said memory, for computing the current cost of a telecommunication session and displaying said computation on said display.

12. A programmable apparatus as claimed in claim 10 wherein said processor having means, linked to said memory, for displaying on said display in an order of preference and an order of least expensive cost of call, said low cost call carrier database data.

13. A programmable apparatus as claimed in claim 12 including means, linked to said memory, permitting said user to select one preferred low cost call carrier from said database and storing said selected carrier data as said user preference low cost call carrier for a specific day, time and destination.

14. A programmable apparatus as claimed in claim 10 including means, linked to said memory, for permitting said user to select one of said plurality of low cost call carriers on an immediate basis to establish an immediate telecommunications link.

15. A programmable apparatus as claimed in claim 10 including means for storing, in a call timer database in said memory, data representing said time duration and said current day, date, time of day and data representing the utilized one of said preference low cost call carrier and said least expensive low cost call carrier and including means, linked to said memory, for displaying, upon command of said user, said stored cost of calls.

16. A programmable apparatus as claimed in claim 15 including user selectable means, coupled to said processor and said memory, for activating the following functions:
    means for activating the display, upon command of said user, of said stored cost of calls;
    means, linked to said memory, for displaying on said display in an order of preference and an order of least expensive cost of call, said low cost call carrier database data;
    means, linked to said memory, for permitting said user to select one preferred low cost call carrier from said database and storing said selected carrier as said user preference for a specific day, time and destination; and,
    means, linked to said memory, for permitting said user to select one of said plurality of low cost call carriers on an immediate basis to establish an immediate telecommunications link.

17. A programmable apparatus as claimed in claim 16 wherein said processor includes means for displaying said functions in a scrolling manner on said display.

18. A programmable apparatus as claimed in claim 1 wherein said second telecommunications line is adapted to carry a three way conference call between a first remote telecommunications device, said initiating telecommunications device and a remote destination telecommunications device, said apparatus including:
    means, linked to said processor and said memory, for decoding an incoming telecommunications signal from said first remote telecommunications device as requesting a conference call to said remote destination telecommunications device via said one of said preference low cost call carrier and said least expensive low cost call carrier;
    means, linked to said processor and said memory, for establishing said telecommunications link between said initiating telecommunications device and said destination telecommunications device over one of said preference low cost call carrier and said least expensive low cost call carrier upon the conference call request; and
    means, linked to said processor and said memory, for establishing said three way conference call with said first remote telecommunications device, said initiating telecommunications device and a remote destination telecommunications device over said one of said preference low cost call carrier and said least expensive low cost call carrier.

19. A programmable apparatus for routing telephone communications through a preferred low cost call carrier to a telecommunications device at a destination, said programmable apparatus connected, via a local telephone telecommunications line, to an initiating telecommunications device, which initiates the telephone communications session by generating a dual tone multifrequency (DTMF) signal representative of a destination telephone number, said programmable apparatus connected to a second telephone telecommunications line which is coupled to a plurality of telecommunications carriers, said programmable apparatus periodically coupled via a telecommunications link to a remotely disposed computer, said programmable apparatus comprising:
    input and output devices respectively coupled to said local telecommunications line and said second telecommunications line and drawing power therefrom, said input and output devices having means to convert said DTMF signals into digital signals and digital signals into DTMF signals, said input and output devices respectively configured as a first and a second port, said first port handling signal communications between said initiating telecommunications device and a processor and second port handling signal communications between said programmable device and said second telephone telecommunications line and wherein one of said first and second ports have a register memory which holds said converted DTMF signals in said register memory prior to said processor drawing power from said telephone telecommunications line;

said processor coupled to a memory and also coupled to said input and output devices via said first and second ports;

a database stored in said memory and containing information, including access telephone numbers, clearance code data, cost of call rate data for specific destinations, day, date and time of day, all for said plurality of telecommunications carriers;

said processor having means, linked to said memory, for decoding said destination telephone number and obtaining a respective access number and clearance code data for one of a preference low cost call carrier and a least expensive low cost call carrier from said database based upon a one of corresponding preselected user preference and a least expensive cost of call rate data for a current day, date, time of day and destination;

said processor having means, linked to said memory, for compiling said respective access number, clearance code data and destination telephone number into a signal packet and sending said signal packet to said second telecommunications line via said input and output devices and said second port thereby establishing a telecommunications link between said initiating telecommunications device and said destination telecommunications device over one of said preference low cost call carrier and said least expensive low cost call carrier;

said processor having an update timer and means, linked to said memory, for opening said telecommunications link with said remotely disposed computer based upon said update timer; and, said processor having means, linked to said memory, for revising said database information based upon update information downloaded from said remotely disposed computer regarding said plurality of telecommunications carriers.

20. A programmable apparatus as claimed in claim 19 wherein said plurality of telecommunications carriers are coupled to a central telecommunications office and the programmable apparatus includes coupling said second port to said central office via said second telecommunications line.

21. A programmable apparatus as claimed in claim 20 wherein said processor includes means, linked to said memory, for capturing and storing in said memory a time duration of each call over said one of said preference low cost call carrier and said least expensive low cost call carrier.

22. A programmable apparatus as claimed in claim 21 including means for storing, in a call timer database in said memory, data representing said time duration and said current day, date, time of day, destination telephone number and data representing the utilized one of said preference low cost call carrier and said least expensive low cost call carrier.

23. A programmable apparatus as claimed in claim 22 wherein said processor includes means, linked to said memory, for uploading the call timer database data to said remotely disposed computer during the corresponding open telecommunications link.

24. A programmable apparatus as claimed in claim 19 wherein said processor includes means, linked to said memory, for determining when a time to connect to said one of said preference low cost call carrier and said least expensive low cost call carrier exceeds a predetermined period and, in such event, for selecting, compiling and establishing a new telecommunications link with a low cost call carrier having a next available, least expensive cost of call rate for said current day, date, time of day and destination.

25. A programmable apparatus as claimed in claim 23 wherein said processor includes means, linked to said memory, for determining when a time to connect to said one of said preference low cost call carrier and said least expensive low cost call carrier exceeds a predetermined period and, in such event, for selecting, compiling and establishing a new telecommunications link with a low cost call carrier having a next available, least expensive cost of call rate for said current day, date, time of day and destination.

26. A programmable apparatus as claimed in claim 19 including a display and a user actuatable input device, both coupled to said processor, said processor having means, linked to said memory, for accepting user inputs, via said user input device, as prompted by visual data presented on said display.

27. A programmable apparatus as claimed in claim 26 wherein said processor having means, linked to said memory, for displaying on said display in an order of preference and an order of least expensive cost of call, said low cost call carrier database data.

28. A programmable apparatus as claimed in claim 27 including means, linked to said memory, permitting said user to immediately select one preferred low cost call carrier from said database and storing said selected carrier data as said user preference low cost call carrier for a specific day, time and destination.

29. A programmable apparatus as claimed in claim 28 including means for storing, in a call timer database in said memory, data representing said time duration and said current day, date, time of day and data representing the utilized one of said preference low cost call carrier and said least expensive low cost call carrier and including means, linked to said memory, for displaying, upon command of said user, said stored cost of calls.

30. A programmable apparatus as claimed in claim 19 wherein said second telecommunications line is adapted to carry a three way conference call between a first remote telecommunications device, said initiating telecommunications device and a remote destination telecommunications device, said apparatus including:

means, linked to said processor and said memory, for decoding an incoming telecommunications signal from said first remote telecommunications device as requesting a conference call to said remote destination telecommunications device via said one of said preference low cost call carrier and said least expensive low cost call carrier;

means, linked to said processor and said memory, for establishing said telecommunications link between said initiating telecommunications device and said destina tion telecommunications device over one of said preference low cost call carrier and said least expensive low cost call carrier upon the conference call request; and means, linked to said processor and said memory, for establishing said three way conference call with said first remote telecommunications device, said initiating telecommunications device and a remote destination telecommunications device over said one of said preference low cost call carrier and said least expensive low cost call carrier.

* * * * *